(12) United States Patent
Zhou et al.

(10) Patent No.: US 11,728,874 B2
(45) Date of Patent: Aug. 15, 2023

(54) TECHNIQUES AND APPLICATIONS OF MANAGING BFD-RS SET CONFIGURED WITH MULTIPLE BEAMS

(71) Applicant: QUALCOMM Incorporated, San Diego, CA (US)

(72) Inventors: Shanyu Zhou, San Diego, CA (US); Jelena Damnjanovic, Del Mar, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/454,018

(22) Filed: Nov. 8, 2021

(65) Prior Publication Data

US 2023/0146347 A1    May 11, 2023

(51) Int. Cl.
| | |
|---|---|
| *H04B 7/06* | (2006.01) |
| *H04L 1/20* | (2006.01) |
| *H04L 5/00* | (2006.01) |
| *H04W 74/08* | (2009.01) |
| *H04W 76/19* | (2018.01) |
| *H04W 80/02* | (2009.01) |

(52) U.S. Cl.
CPC .......... *H04B 7/0695* (2013.01); *H04L 1/203* (2013.01); *H04L 5/0051* (2013.01); *H04W 74/0841* (2013.01); *H04W 76/19* (2018.02); *H04W 80/02* (2013.01)

(58) Field of Classification Search
CPC ..... H04B 7/0695; H04L 1/203; H04L 5/0051; H04W 74/0841; H04W 76/19; H04W 80/02
See application file for complete search history.

(56) References Cited

U.S. PATENT DOCUMENTS

| | | | |
|---|---|---|---|
| 11,626,920 B2* | 4/2023 | Lee ........................ | H04W 76/19 |
| | | | 370/329 |
| 2020/0169958 A1* | 5/2020 | Lee ....................... | H04W 52/146 |
| 2021/0058805 A1* | 2/2021 | Ji ........................... | H04W 72/56 |
| 2021/0314053 A1* | 10/2021 | Matsumura ........... | H04L 5/0025 |
| 2022/0085862 A1* | 3/2022 | Kung ..................... | H04L 1/1819 |
| 2022/0132517 A1* | 4/2022 | Zhu ........................ | H04L 5/0094 |
| 2022/0330060 A1* | 10/2022 | Awadin ................. | H04W 24/08 |
| 2022/0386150 A1* | 12/2022 | Eldessoki ............. | H04W 74/02 |

\* cited by examiner

*Primary Examiner* — Harry H Kim
(74) *Attorney, Agent, or Firm* — Procopio, Cory, Hargreaves & Savitch LLP

(57) ABSTRACT

A base station may transmit, to a UE, a configuration set associated with a BFD-RS set corresponding to a plurality of beams including a first beam via an RRC message. The base station may transmit, to the UE, a BFD-RS associated with the first beam. The BFD-RS may be associated with the BFD-RS set. The UE may detect a BFI indication of the first beam based on the BFD-RS from the base station. The UE may increment a BFI counter in response to the detected BFI indication of the first beam irrespective of a status associated with other beams in the plurality of beams. The UE and the base station may perform a BFR procedure in response to the BFI counter reaching or exceeding a corresponding BFI counter threshold.

23 Claims, 15 Drawing Sheets

TECHNIQUES AND APPLICATIONS OF MANAGING BFD-RS SET CONFIGURED WITH MULTIPLE BEAMS

TECHNICAL FIELD

The present disclosure relates generally to communication systems, and more particularly, to beam failure management in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may detect a beam failure instance (BFI) indication of a first beam based on a beam failure detection (BFD)-reference signal (RS) (BFD-RS) from a base station. The BFI indication may correspond to a radio link quality associated with the first beam being below a link quality threshold. The BFD-RS may be associated with a BFD-RS set corresponding to a plurality of beams including the first beam. The apparatus may increment a BFI counter in response to the detected BFI indication of the first beam irrespective of a status associated with other beams in the plurality of beams. The apparatus may perform a beam failure recovery (BFR) procedure in response to the BFI counter reaching or exceeding a corresponding BFI counter threshold.

In an aspect of the disclosure, a method, a computer-readable medium, and an apparatus are provided. The apparatus may be a base station. The apparatus may transmit, to a UE, a configuration set associated with a BFD-RS set corresponding to a plurality of beams including a first beam via a radio resource control (RRC) message. The apparatus may transmit, to the UE, a BFD-RS associated with the first beam. The BFD-RS may be associated with the BFD-RS set. Based on the configuration set, incrementation of a BFI counter may be in response to a BFI indication of the first beam based on the BFD-RS irrespective of a status associated with other beams in the plurality of beams. The apparatus may perform a BFR procedure based on the BFI counter reaching or exceeding a corresponding BFI counter threshold. The BFI indication may correspond to a radio link quality of the first beam being below a link quality threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
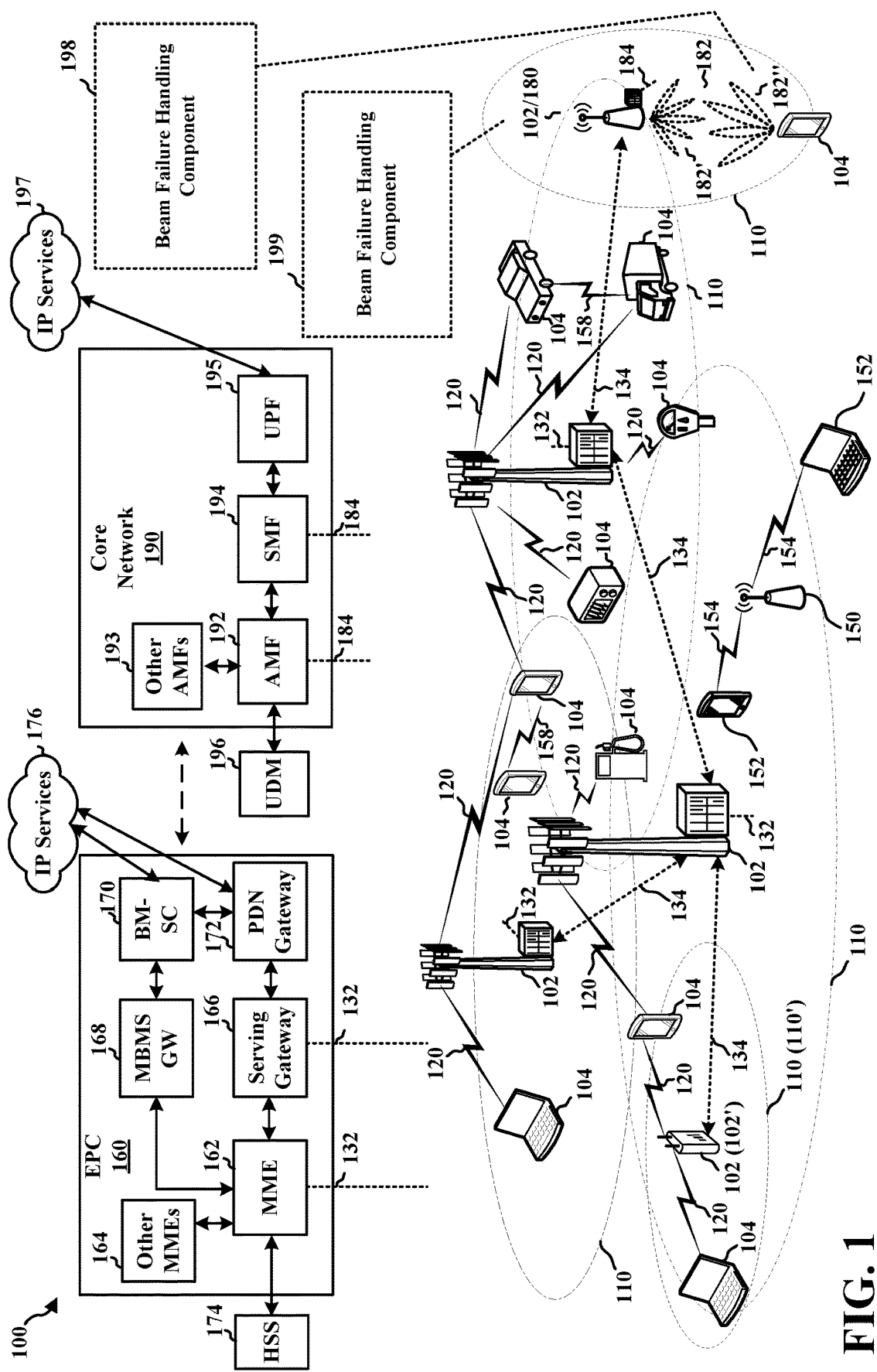
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmission reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a beam failure handling component 198 that may be configured to detect a BFI indication of a first beam based on a BFD-RS from a base station. The BFI indication may correspond to a radio link quality associated with the first beam being below a link quality threshold. The BFD-RS may be associated with a BFD-RS set corresponding to a plurality of beams including the first beam. The beam failure handling component 198 may be configured to increment a BFI counter in response to the detected BFI indication of the first beam irrespective of a status associated with other beams in the plurality of beams. The beam failure handling component 198 may be configured to perform a BFR procedure in response to the BFI counter reaching or exceeding a corresponding BFI counter threshold. In certain aspects, the base station 180 may include a beam failure handling component 199 that may be configured to transmit, to a UE, a configuration set associated with a BFD-RS set corresponding to a plurality of beams including a first beam via an RRC message. The beam failure handling component 199 may be configured to transmit, to the UE, a BFD-RS associated with the first beam. The BFD-RS may be associated with the BFD-RS set. Based on the configuration set, incrementation of a BFI counter may be in response to a BFI indication of the first beam based on the BFD-RS irrespective of a status associated with other beams in the plurality of beams. The BFI indication may correspond to a radio link quality of the first beam being below a link quality threshold. The beam failure handling component 199 may be configured to perform a BFR procedure based on the BFI counter reaching or exceeding a corresponding BFI counter threshold. Although the following description may be focused on 5G NR, the concepts described herein may be applicable to other similar areas, such as LTE, LTE-A, CDMA, GSM, and other wireless technologies.

Figure 2:
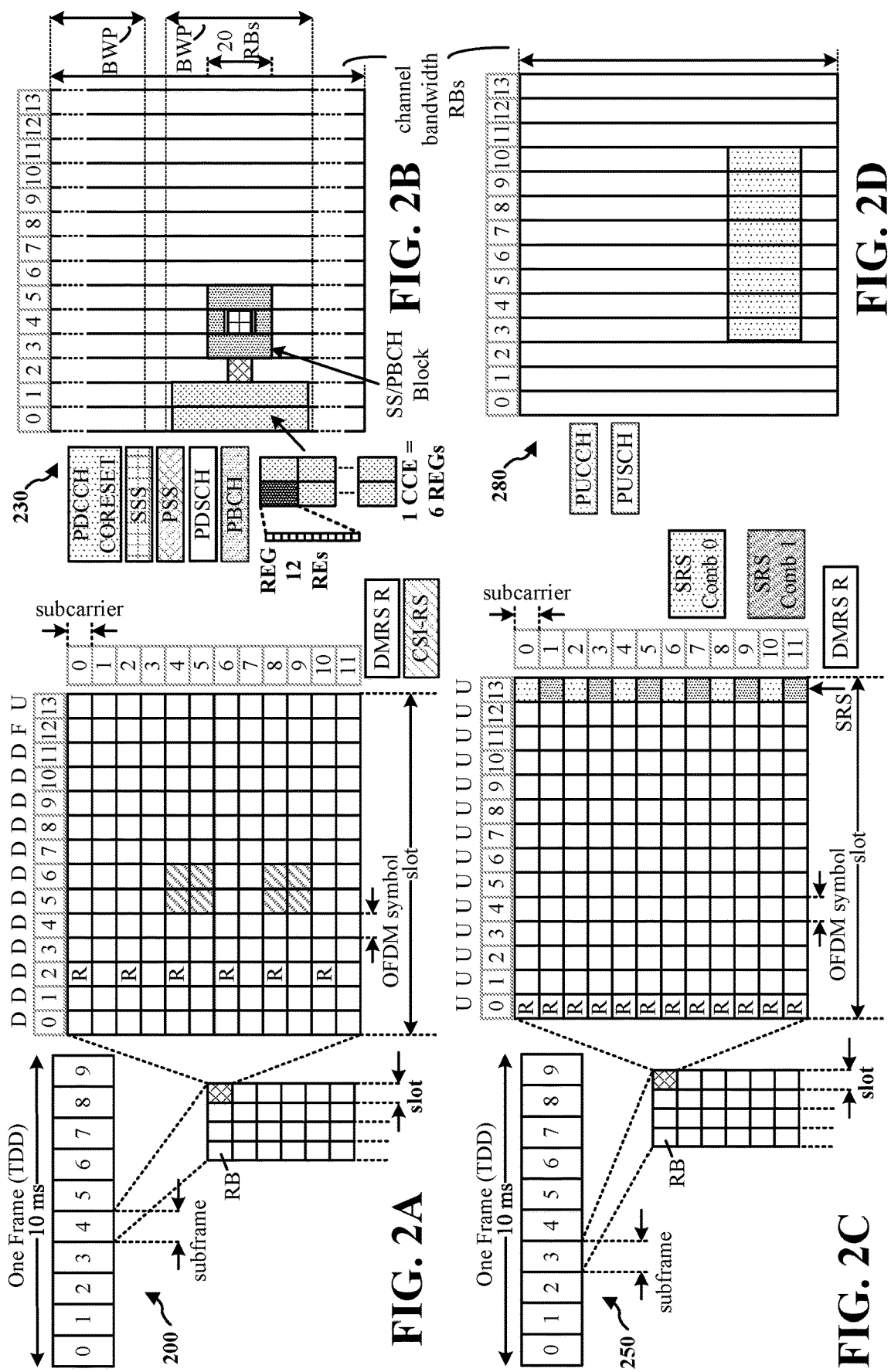
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
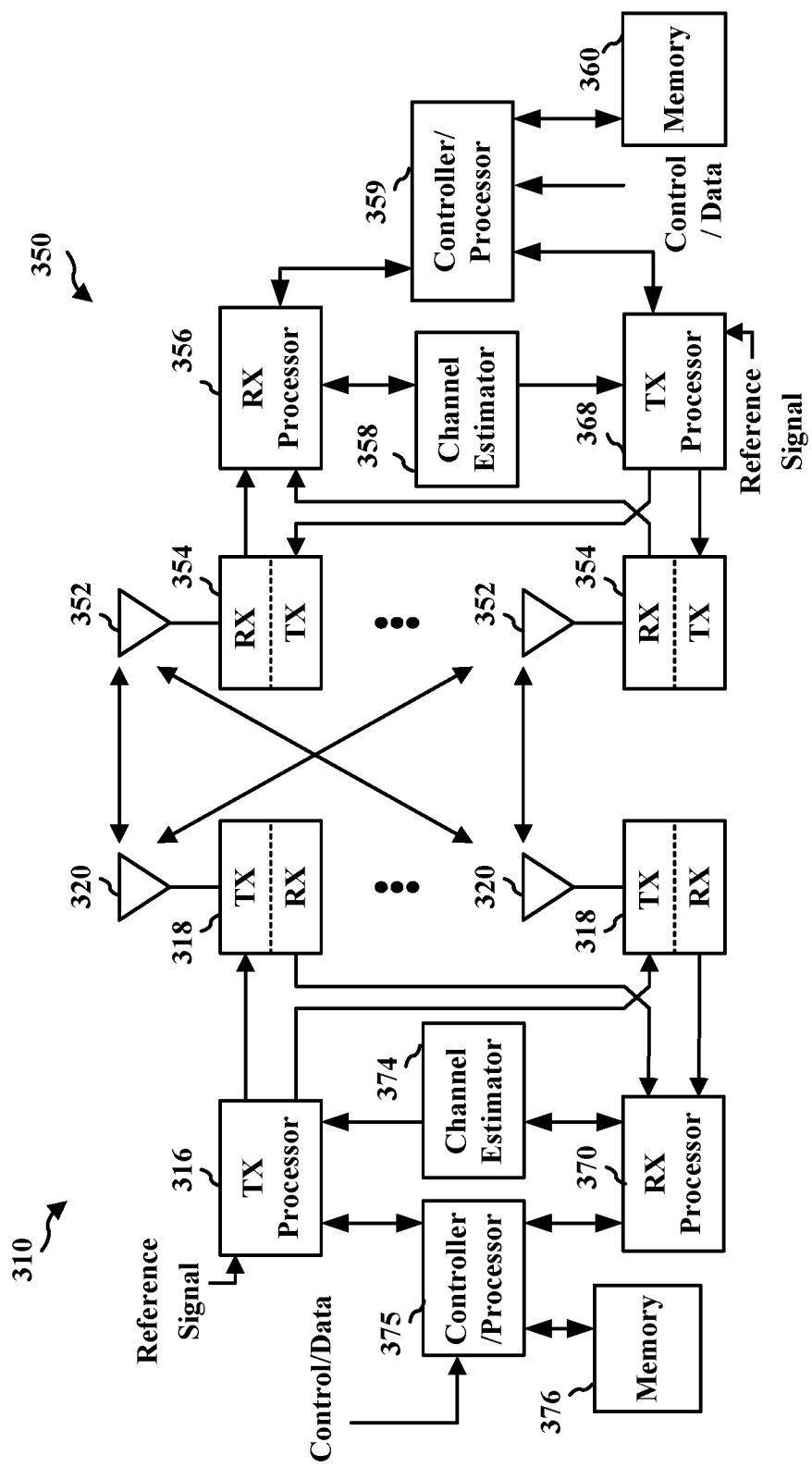
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
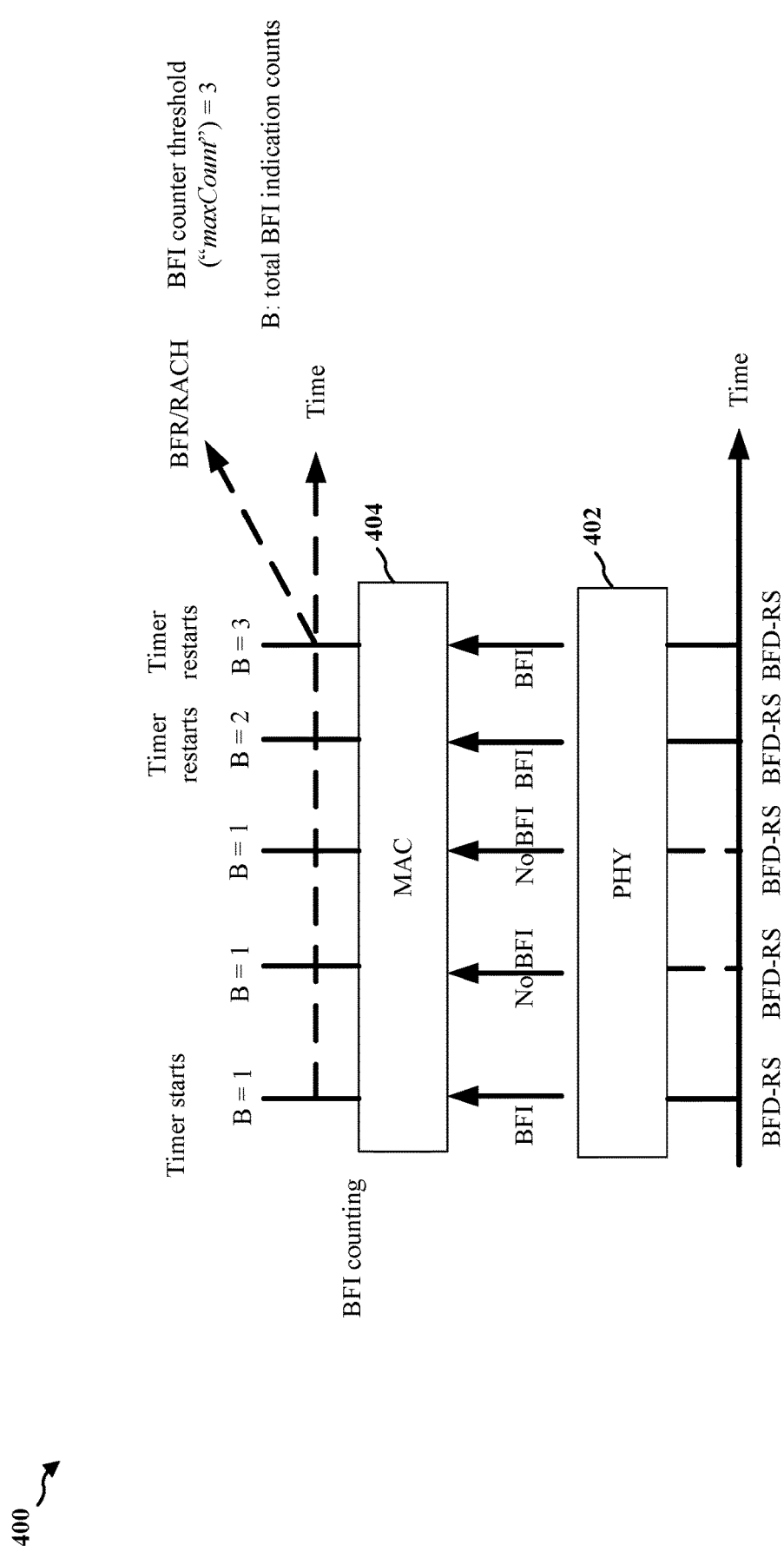
FIG. 4 is a diagram illustrating an example single beam BFD procedure according to an original BFD configuration.

FIG. 4 is a diagram 400 illustrating an example single beam BFD procedure according to an original BFD configuration. The radio link between a UE and a base station may be susceptible to blockage and degradation of RF signal, which may interrupt the communication link and cause beam failure. The UE may detect the beam failure in the BFD procedure, and may attempt to recover from the beam failure with the help of the BFR procedure. The BFD procedure and the BFR procedure may be a combined effort of the UE PHY layer 402 and MAC layer 404 procedures without involvement of higher layer signaling.

In particular, if the UE communicates with the base station using a single beam pair (which may include one UE beam and one base station beam), the base station may periodically transmit a BFD-RS to the UE using the corresponding base station beam. The BFD-RS may be a CSI-RS or an SSB. At each BFD-RS occasion (i.e., the occasion when the base station transmits the BFD-RS), the UE may measure the BFD-RS using the corresponding UE beam. Based on the measurement, if the estimated hypothetical PDCCH block error ratio (BLER) is greater than a threshold (e.g., 10%) (which may indicate that a radio link quality associated with the UE beam is less than a corresponding threshold), the UE PHY layer 402 may report a BFI to the UE MAC layer 404. Herein the base station/TRP beam in the beam pair may not be explicitly illustrated or described, and the beam pair may be described simply as a beam, which may correspond to the UE beam in the respective beam pair from the perspective of the UE.

The UE MAC layer 404 may count the indications of the BFIs (i.e., BFI indications) from the UE PHY layer 402, and may initiate the BFR procedure when the BFI counter has reached or exceeded a configured BFI counter threshold (e.g., the value of the "maxCount" parameter). In particular, every time the UE MAC layer 404 receives an indication of a BFI from the UE PHY layer 402, the UE MAC layer 404 may start or restart a timer (e.g., a BFD timer), and may increment the BFI counter by 1. When the BFI counter reaches or exceeds the corresponding BFI counter threshold (e.g., in the illustrated example, the BFI counter threshold may be 3), the UE MAC layer 404 may declare a beam failure, and the UE MAC layer 404 may initiate the BFR procedure in an attempt to recover from the beam failure. In the BFR procedure, the UE may perform a random access channel (RACH) procedure using a new candidate beam. If the UE MAC layer 404 does not receive an additional BFI indication before the timer (e.g., the BFD timer) expires, the UE MAC layer 404 may reset the BFI counter (e.g., to '0'). In other words, if a certain period of time has lapsed since the last BFI indication without receiving an additional BFI indication from the UE PHY layer 402, the UE MAC layer 404 may assume that there is no beam failure.

Figure 5:
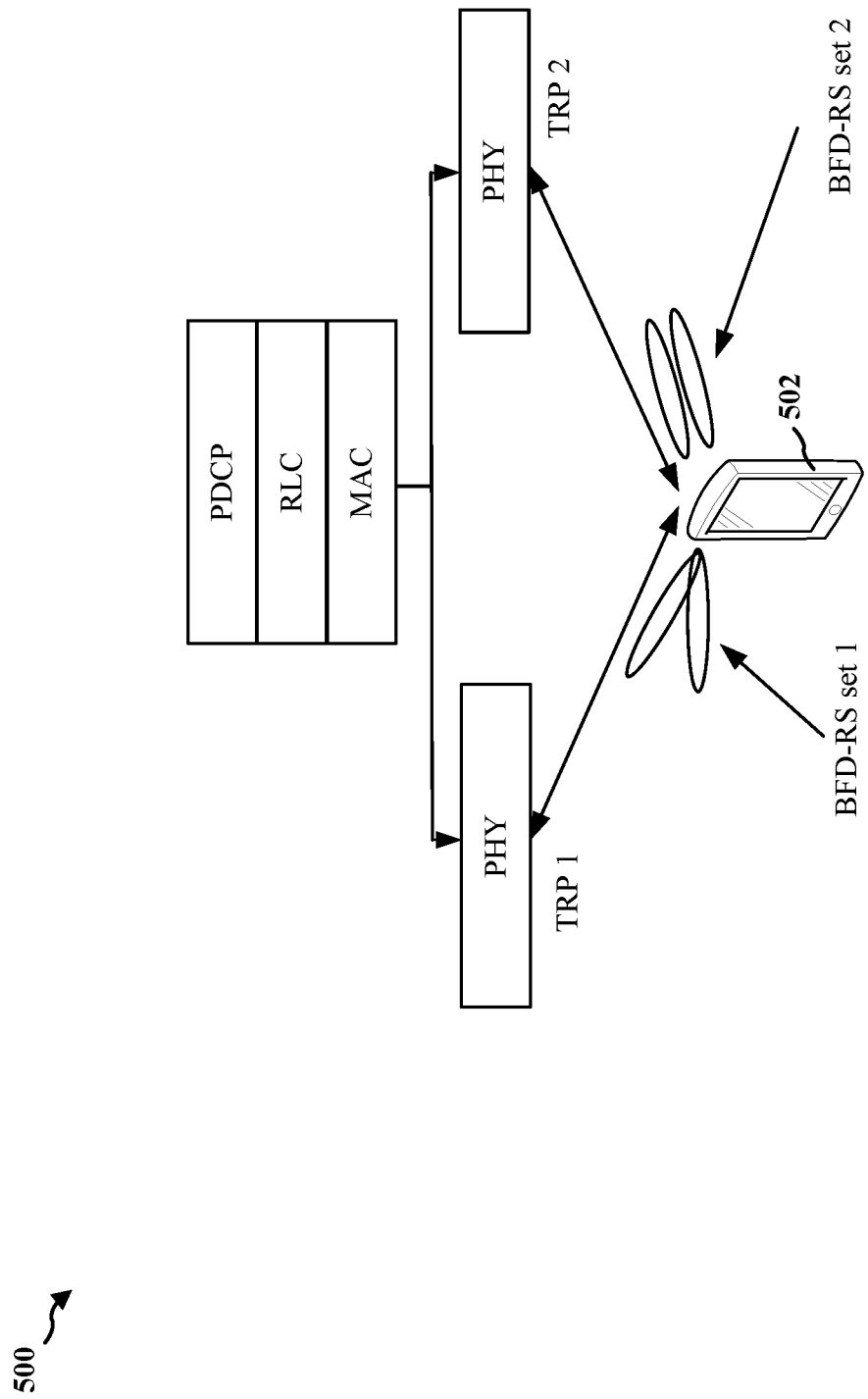
FIG. 5 is a diagram illustrating an example multiple beam BFD procedure in connection with a multi-TRP configuration according to an original BFD configuration.

FIG. 5 is a diagram 500 illustrating an example multiple beam BFD procedure in connection with a multi-TRP configuration according to an original BFD configuration. The TRPs (e.g., TRP 1 and TRP 2) may share PDCP, RLC, and MAC layers, and may have separate PHY layers. According to a multi-TRP BFD and BFR configuration, each TRP may be configured with one BFD-RS set. Each BFD-RS set may correspond to one or more beams associated with the respective TRP. The UE 502 may use each UE beam to measure one respective BFD-RS in the corresponding BFD-RS set. Each TRP, and therefore each BFD-RS set may be associated with a respective BFD procedure. During a BFD procedure corresponding to one TRP, the UE 502 may use each beam to measure a respective BFD-RS at a BFD-RS occasion, and may estimate the hypothetical PDCCH BLER for each beam. The UE PHY layer may report a BFI (i.e., the UE PHY layer may transmit a BFI indication) for a BFD-RS set to the UE MAC layer if the hypothetical PDCCH BLERs for all beams corresponding to the TRP/BFD-RS set are greater than a preconfigured threshold (e.g., 10%). The UE MAC layer may count BFI indications for the TRP/BFD-RS set, and may perform the BFR procedure, in a similar fashion to the UE MAC layer in the single beam BFD scenario described above. If the hypothetical PDCCH BLERs for some but not all beams corresponding to the TRP/BFD-RS set are greater than the preconfigured threshold, the UE PHY layer may not report a BFI for the BFD-RS set to the UE MAC layer.

Figure 6:
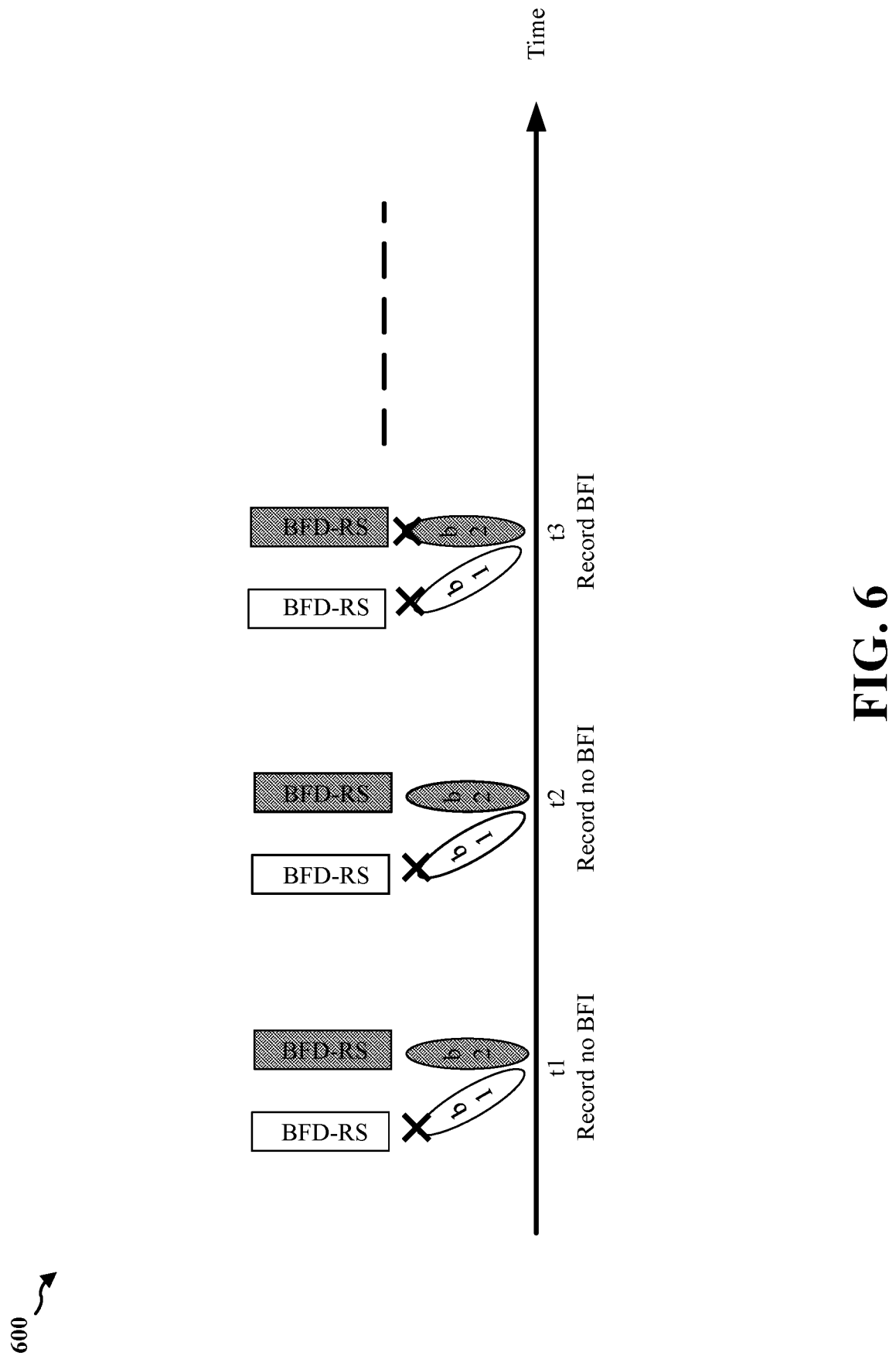
FIG. 6 is a diagram illustrating another example multiple beam BFD procedure in connection with a multi-TRP configuration according to the original BFD configuration.

FIG. 6 is a diagram 600 illustrating another example multiple beam BFD procedure in connection with a multi-TRP configuration according to the original BFD configuration. In FIG. 6, the BFD-RS set, which may be associated with one TRP in a multi-TRP setup, may correspond to two beams (the respective UE beams being beam 1 (b1) and beam 2 (b2); the TRP beams not shown). At each BFD-RS occasion (e.g., t1, t2, t3, etc.), the UE PHY layer may report a BFI for a BFD-RS set to the UE MAC layer if the hypothetical PDCCH BLERs for both beams (b1 and b2) corresponding to the TRP/BFD-RS set are greater than a preconfigured threshold (e.g., at the BFD-RS occasion t3). If the hypothetical PDCCH BLER for one beam but not both beams corresponding to the TRP/BFD-RS set is greater than the preconfigured threshold (e.g., at the BFD-RS occasions t1 and t2), the UE PHY layer may not report a BFI for the BFD-RS set to the UE MAC layer. Not reporting or recording a BFI when the radio link quality of one beam but not both beams falls below a threshold may not be suitable for all scenarios. For example, when the channel condition deteriorates, service disruption may result. In another example, an increased latency may be introduced as a result of the coarse granularity of the BFD procedure during the BFR procedure. Accordingly, based on a number of different factors, it may be desirable for the UE to manage the beam failure of the multiple beams corresponding to a TRP/BFD-RS set in a different fashion. The factors may include, e.g., the QoS specification of the traffic, the wireless channel condition, etc. One or more aspects of the disclosure may relate to enhanced BFD configurations for managing the beam failure of multiple beams corresponding to a TRP/BFD-RS set in a different fashion than that associated with the original BFD configuration described above. The enhanced BFD configurations may be associated with enhanced BFD procedures for multiple beams.

Figure 7:
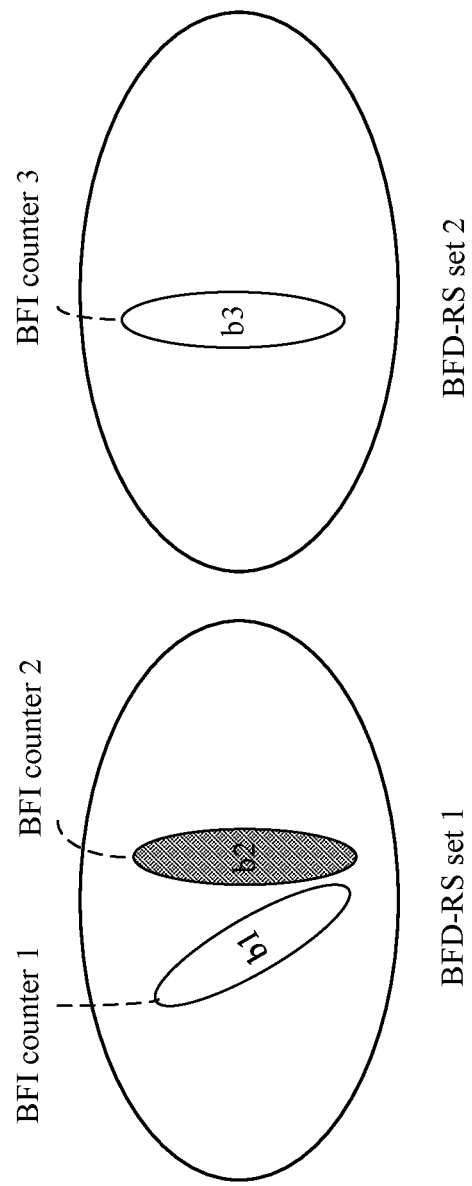
FIG. 7 is a diagram illustrating an example multiple beam BFD procedure in connection with a multi-TRP configuration according to a first example enhanced BFD configuration according to one aspect.

FIG. 7 is a diagram 700 illustrating an example multiple beam BFD procedure in connection with a multi-TRP configuration according to a first example enhanced BFD configuration according to one aspect. The UE may individually manage each beam regardless of the number of beams corresponding to a BFD-RS set. In other words, the UE may operate the BFD procedure at a per-beam level. A separate BFD procedure may be performed for each beam. In particular, each of the beams (including the beams associated with a BFD-RS set that corresponds to multiple beams) may be associated with its own BFI counter. As shown in FIG. 7, the BFD-RS set 1 may correspond to two beams: b1 and b2. Each of the beams b1 and b2 may be associated with a respective BFI counter. b1 may be associated with the BFI counter 1, and b2 may be associated with the BFI counter 2. The BFD-RS set 2 may correspond to one beam: b3. b3 may be associated with the BFI counter 3. It should be appreciated that the BFD procedure may remain the same as that according to the original BFD configuration for a BFD-RS set that may correspond to a single beam (e.g., the BFD-RS set 2).

The base station may configure a respective BFD-RS for each beam, and the UE may measure the respective BFD-RS using the corresponding beam at the BFD-RS occasion. The base station may configure BFD related parameters for each beam. The configurations may include, e.g., a BFD timer configuration (e.g., a timer duration), a hypothetical PDCCH BLER threshold configuration, a BFI counter threshold configuration (e.g., the value of the "maxCount" parameter), etc. The UE MAC layer may detect and declare beam failure for each beam independently from other beams irrespective of the relationship between the beams and the BFD-RS sets. Further, the UE may individually perform the BFR procedure for each beam. In particular, to perform the BFR procedure for a beam, the UE may use L2 (e.g., MAC layer) signaling (e.g., a BFR MAC-control element (MAC-CE)) transmitted using one or more other working beams. The one or more other working beams used in the BFR procedure may be associated with the same TRP as the failed beam, or may be associated with a different TRP than the TRP associated with the failed beam. With the help of the L2 signaling transmitted using another working beam, the BFR procedure may include a beam switching procedure rather than a RACH procedure. A beam switching procedure may be faster than a RACH procedure. In another configuration, the BFR procedure may include a RACH procedure using a new candidate beam.

Operating the BFD procedure at a per-beam level may represent a BFD procedure at a finer granularity than the BFD procedure operated according to the original BFD configuration, which may be at the BFD-RS set level. Individually performing the BFD procedure for each beam may be more suitable for traffic that may specify high reliability, high service consistency, and/or low latency. However, the per-beam level BFD procedure may be more demanding with respect to the UE capability compared to the BFD procedure according to the original BFD configuration.

Figure 8:
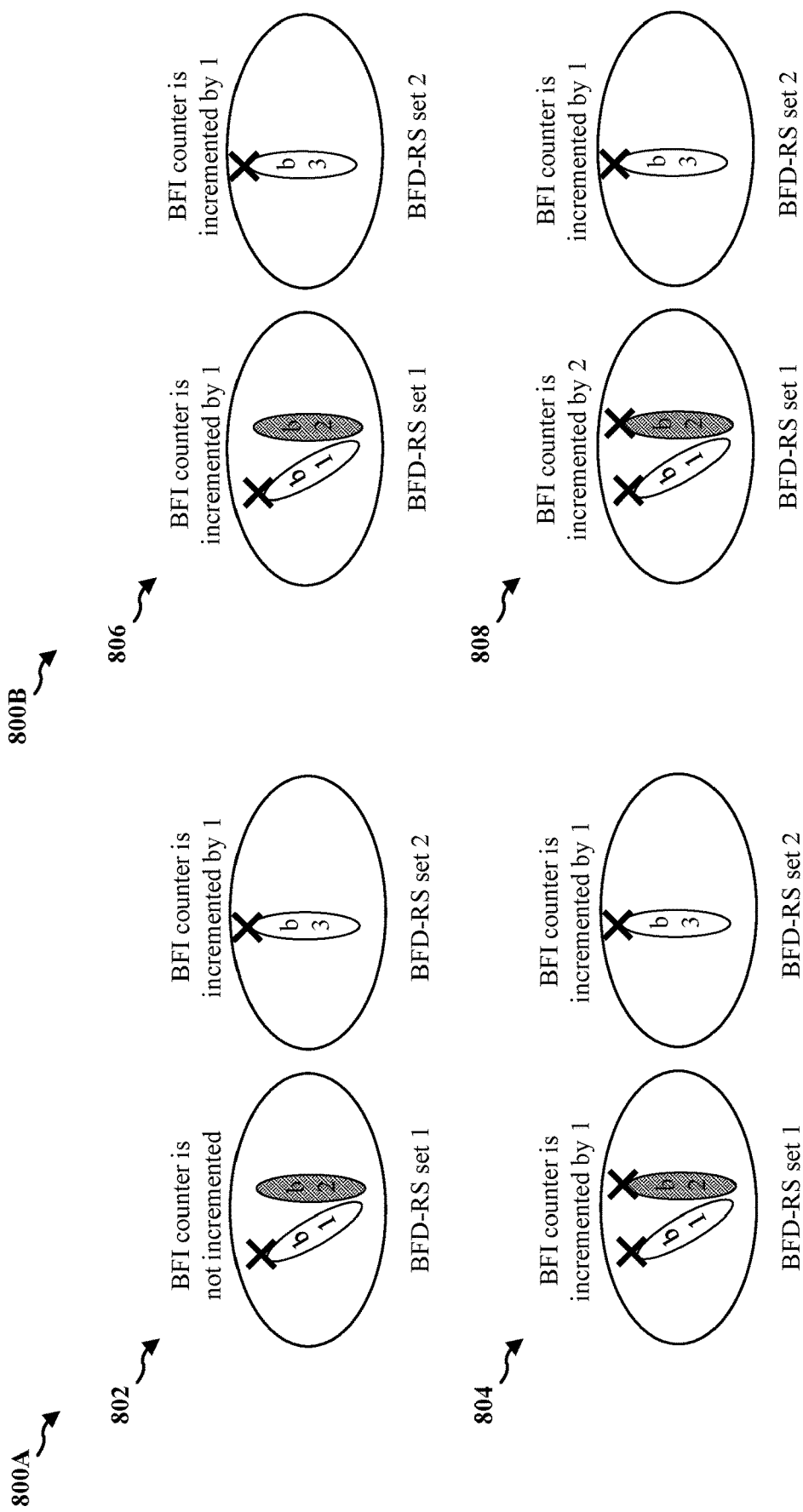
FIG. 8A is a diagram illustrating example multiple beam BFD procedures in connection with a multi-TRP configuration according to the original BFD configuration.
FIG. 8B is a diagram illustrating example multiple beam BFD procedures in connection with a multi-TRP configuration according to a second example enhanced BFD configuration according to one aspect.

FIG. 8A is a diagram 800A illustrating example multiple beam BFD procedures in connection with a multi-TRP configuration according to the original BFD configuration. FIG. 8B is a diagram 800B illustrating example multiple beam BFD procedures in connection with a multi-TRP configuration according to a second example enhanced BFD configuration according to one aspect. The UE may manage the beam failure at a BFD-RS set level, while taking into account the link quality associated with individual beams corresponding to the BFD-RS set. The base station may configure the UE to operate the BFD procedure at a BFD-RS set level. The UE may take into account the link quality associated with each individual beam corresponding to the BFD-RS set even when not all beams corresponding to the BFD-RS set are associated with a link quality that is less than a threshold. The base station may configure the respective BFD-RS for each beam, and the UE may measure the respective BFD-RS using the corresponding beam at the BFD-RS occasion. The base station may configure BFD related parameters for each BFD-RS set. The configurations may include, e.g., a BFD timer configuration (e.g., a timer duration), a hypothetical PDCCH BLER threshold configuration, a BFI counter threshold configuration (e.g., the value of the "maxCount" parameter), etc.

For a BFD-RS set, the number of BFI indications reported from the UE PHY layer to the UE MAC layer may be based on the radio link quality of the beams corresponding to the BFD-RS set. The poor link quality of individual beams may contribute into the total BFI indication count of the BFD-RS set even when not all beams corresponding to the BFD-RS set are associated with hypothetical PDCCH BLERs that are greater than a hypothetical PDCCH BLER threshold. Referring to FIG. 8B, for the BFD-RS set 1 that corresponds to two beams b1 and b2, according to this enhanced BFD configuration, at 806, when the hypothetical PDCCH BLER associated with b1 is greater than the threshold but the hypothetical PDCCH BLER associated with b2 is not greater than the threshold, the BFI counter associated with the BFD-RS set 1 may nonetheless be incremented by 1 on account of the fact that the link quality of b1 is less than the threshold. This may be contrasted with the BFD procedure according to the original BFD configuration as illustrated at 802 in FIG. 8A, where the BFI counter associated with the BFD-RS set 1 is not incremented when b1 and b2 are in the same condition as they are at 806 because according to the original BFD configuration, the BFI counter associated with a BFD-RS set is not incremented when some but not all beams corresponding to the BFD-RS set are associated with hypothetical PDCCH BLERs that are greater than the threshold, as described above. Further, according to the enhanced BFD configuration, at 808, when the hypothetical PDCCH BLERs associated with both b1 and b2 are greater than the threshold, the BFI counter associated with the BFD-RS set 1 may be incremented by 2 (not 1) on account of the fact that the link quality of both b1 and b2 is less than the threshold. This may be contrasted with the BFD procedure according to the original BFD configuration as illustrated at 804, where the BFI counter associated with the BFD-RS set 1 is incremented by 1 (not 2) when b1 and b2 are in the same condition as they are at 808 because according to the original BFD configuration, the BFI counter associated with a BFD-RS set is incremented by 1 when all beams corresponding to the BFD-RS set are associated with hypothetical PDCCH BLERs that are greater than the threshold, as described above. Accordingly, when the channel condition deteriorates, based on this enhanced BFD configuration, the BFI counter may reach the BFI counter threshold sooner compared to the scenario where the original BFD configuration is used. It should be appreciated that the BFD procedure may remain the same as that according to the original BFD configuration for a BFD-RS set that may correspond to a single beam (e.g., the BFD-RS set 2).

When the BFI counter of a BFD-RS set reaches or exceeds the corresponding BFI counter threshold, the UE may initiate the BFR procedure for all beams associated with the BFD-RS set.

Managing the beam failure at a BFD-RS set level while taking into account the link quality associated with individual beams corresponding to the BFD-RS set may represent a BFD procedure at a finer granularity than the BFD procedure operated according to the original BFD configuration. This enhanced BFD configuration may be more suitable when the channel condition deteriorates (e.g., due to blocking) and a fast BFD and BFR response may be desirable. However, the BFD procedure according to this enhanced BFD configuration may be more demanding with respect to the UE capability compared to the BFD procedure based on the original BFD configuration.

Figure 9:
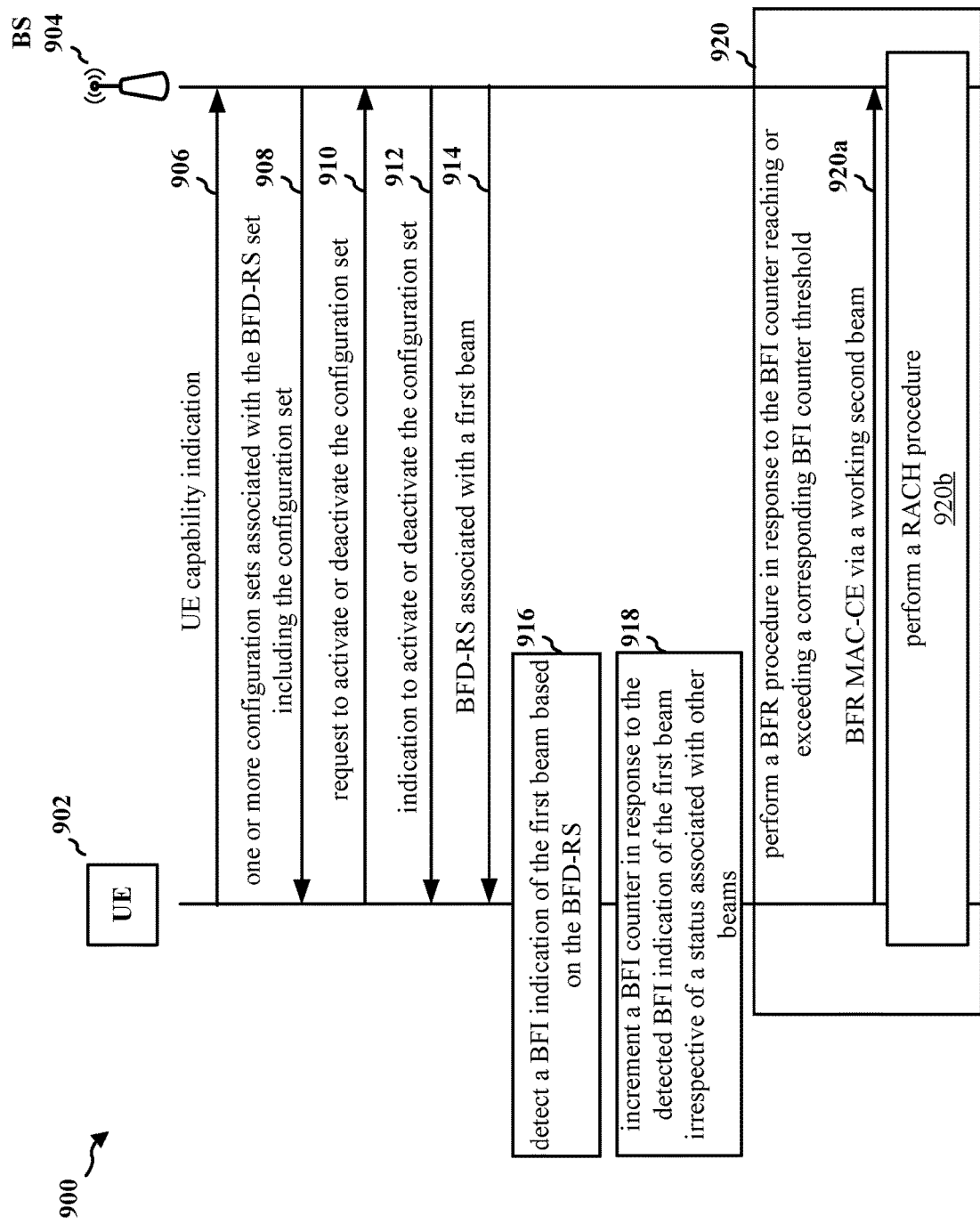
FIG. 9 is a diagram illustrating a communication flow of a method of wireless communication.

FIG. 9 is a diagram of a communication flow 900 of a method of wireless communication. At 906, the UE 902 may transmit, to the base station 904, and the base station 904 may receive, from the UE 902, a UE capability indication via a MAC-CE or a UCI message. The UE capability indication may include at least one of an indication of a number of supported simultaneously active beams or an indication of UE processing capability.

At 908, the base station 904 may transmit, to the UE 902, and the UE 902 may receive, from the base station 904, one or more configuration sets associated with a BFD-RS set via an RRC message. The one or more configuration sets may include a configuration set. The BFD-RS set may correspond to a plurality of beams including a first beam. The BFD-RS set may correspond to a TRP. Each of the one or more configuration sets may include at least one of a BFD timer configuration, a hypothetical PDCCH BLER threshold configuration, or a BFI counter threshold configuration. Each configuration set in the one or more configuration sets may correspond to one of the BFD configurations described above (e.g., the original BFD configuration or one of the enhanced BFD configurations). In one configuration, the base station 904 may configure multiple values for one or more of the parameters (e.g., the BFD timer duration, the hypothetical PDCCH BLER threshold, or the BFI counter threshold) in each of the one or more configuration sets. If multiple values for the parameters are configured with the RRC message, the base station 904 may select or switch the active value to use via a MAC-CE or a DCI message transmitted to the UE 902.

At 910, the UE 902 may transmit, to the base station 904, and the base station 904 may receive, from the UE 902, a request to activate or deactivate the configuration set via a second MAC-CE or a UCI message.

At 912, the base station 904 may transmit, to the UE 902, and the UE 902 may receive, from the base station 904, an indication to activate or deactivate the configuration set via a first MAC-CE or a DCI message. The indication to activate or deactivate the configuration set may be based on at least one of a QoS specification, a wireless channel condition, a UE connected mode discontinuous reception (CDRX) configuration (e.g., the on duration, the off duration), a UE power restraint, a UE capability restraint, or a UE capability (e.g., a UE memory size). For example, if the QoS specification is more stringent and/or the UE is more capable, one of the enhanced BFD configurations that correspond to a BFD procedure at a finer granularity may be activated. Conversely, if the QoS specification is less stringent and/or the UE is less capable, the original BFD configuration that corresponds to a BFD procedure at a coarser granularity may be activated. The indication to activate or deactivate the configuration set may be in response to the request to activate or deactivate the configuration set.

At 914, the base station 904 may transmit, to the UE 902, a BFD-RS associated with the first beam. The BFD-RS may be associated with the BFD-RS set corresponding to the plurality of beams including the first beam.

At 916, the UE 902 may detect a BFI indication of the first beam based on the BFD-RS from a base station 904. The BFI indication of the first beam may correspond to the first beam being associated with a radio link quality that is less than a link quality threshold, which may correspond to the first beam being associated with a hypothetical PDCCH BLER that is greater than a hypothetical PDCCH BLER threshold.

At 918, the UE 902 may increment a BFI counter in response to the detected BFI indication of the first beam irrespective of a status associated with other beams in the plurality of beams. In one configuration, based on the configuration set associated with the BFD-RS set, the BFI counter and the corresponding BFI counter threshold may be associated with the first beam (and not other beams in the plurality of beams). In another configuration, based on the configuration set associated with the BFD-RS set, the BFI counter and the corresponding BFI counter threshold may be associated with the plurality of beams corresponding to the BFD-RS set.

At 920, the UE 902 and the base station 904 may perform a BFR procedure in response to the BFI counter reaching or exceeding a corresponding BFI counter threshold. In one configuration, the BFR procedure may be performed for the first beam (and not other beams in the plurality of beams). In another configuration, the BFR procedure may be performed for the plurality of beams.

At 920a, to perform the BFR procedure 920, the UE 902 may transmit, to the base station 904, and the base station 904 may receive, from the UE 902, a BFR MAC-CE via a working second beam.

At 920b, to perform the BFR procedure 920, the UE 902 and the base station 904 may perform a RACH procedure.

Figure 10:
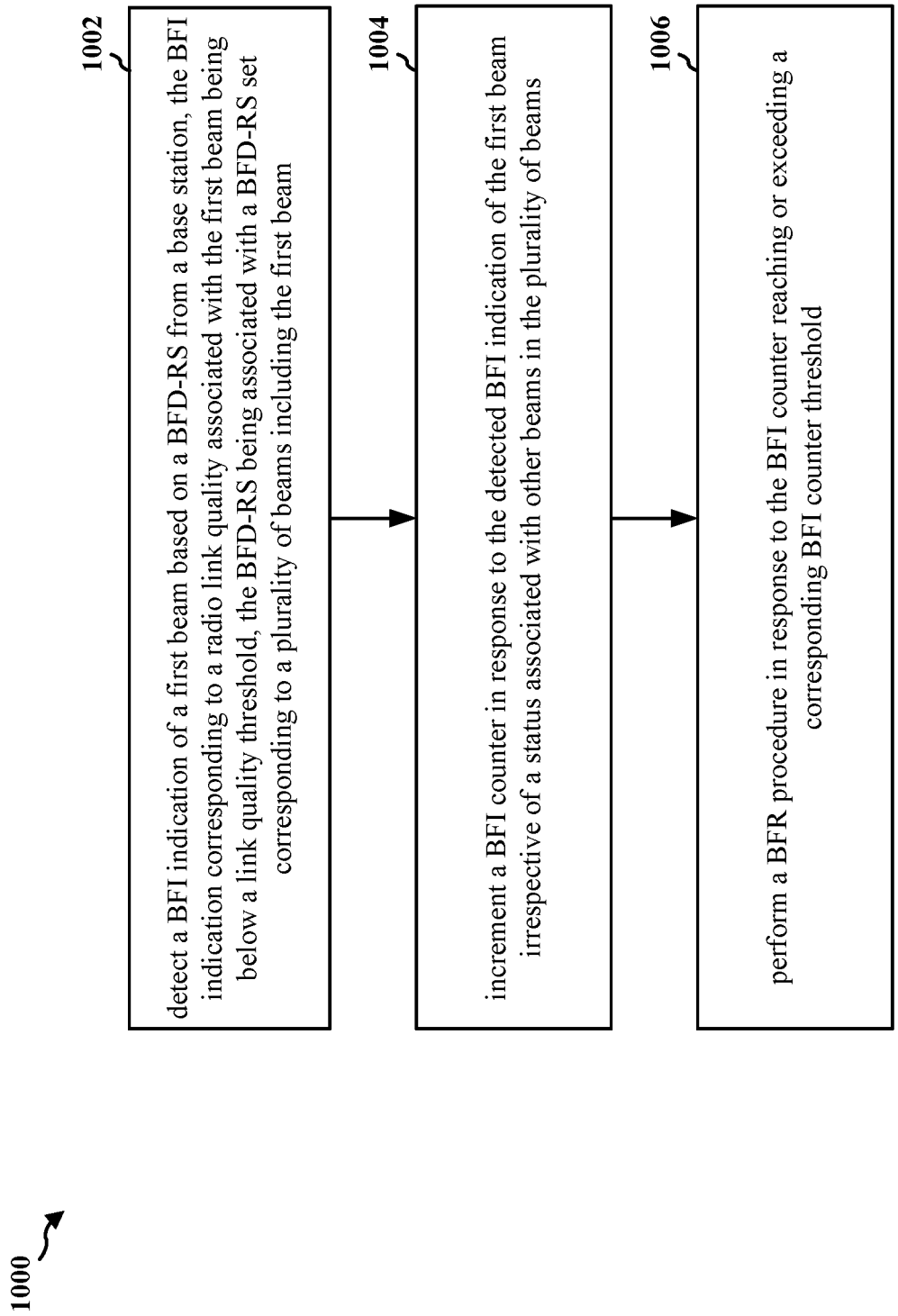
FIG. 10 is a flowchart of a method of wireless communication.

FIG. 10 is a flowchart 1000 of a method of wireless communication. The method may be performed by a UE (e.g., the UE 104/350/902; the apparatus 1402). At 1002, the UE may detect a BFI indication of a first beam based on a BFD-RS from a base station. The BFI indication may correspond to a radio link quality associated with the first beam being below a link quality threshold. The BFD-RS may be associated with a BFD-RS set corresponding to a plurality of beams including the first beam. For example, 1002 may be performed by the beam failure handling component 1440 in FIG. 14. Referring to FIG. 9, at 916, the UE 902 may detect a BFI indication a first beam based on a BFD-RS from a base station 904.

At 1004, the UE may increment a BFI counter in response to the detected BFI indication of the first beam irrespective of a status associated with other beams in the plurality of beams. For example, 1004 may be performed by the beam failure handling component 1440 in FIG. 14. Referring to FIG. 9, at 918, the UE 902 may increment a BFI counter in response to the detected BFI indication of the first beam irrespective of a status associated with other beams in the plurality of beams.

At 1006, the UE may perform a BFR procedure in response to the BFI counter reaching or exceeding a corresponding BFI counter threshold. For example, 1006 may be performed by the beam failure handling component 1440 in FIG. 14. Referring to FIG. 9, at 920, the UE 902 may perform a BFR procedure in response to the BFI counter reaching or exceeding a corresponding BFI counter threshold.

Figure 11:
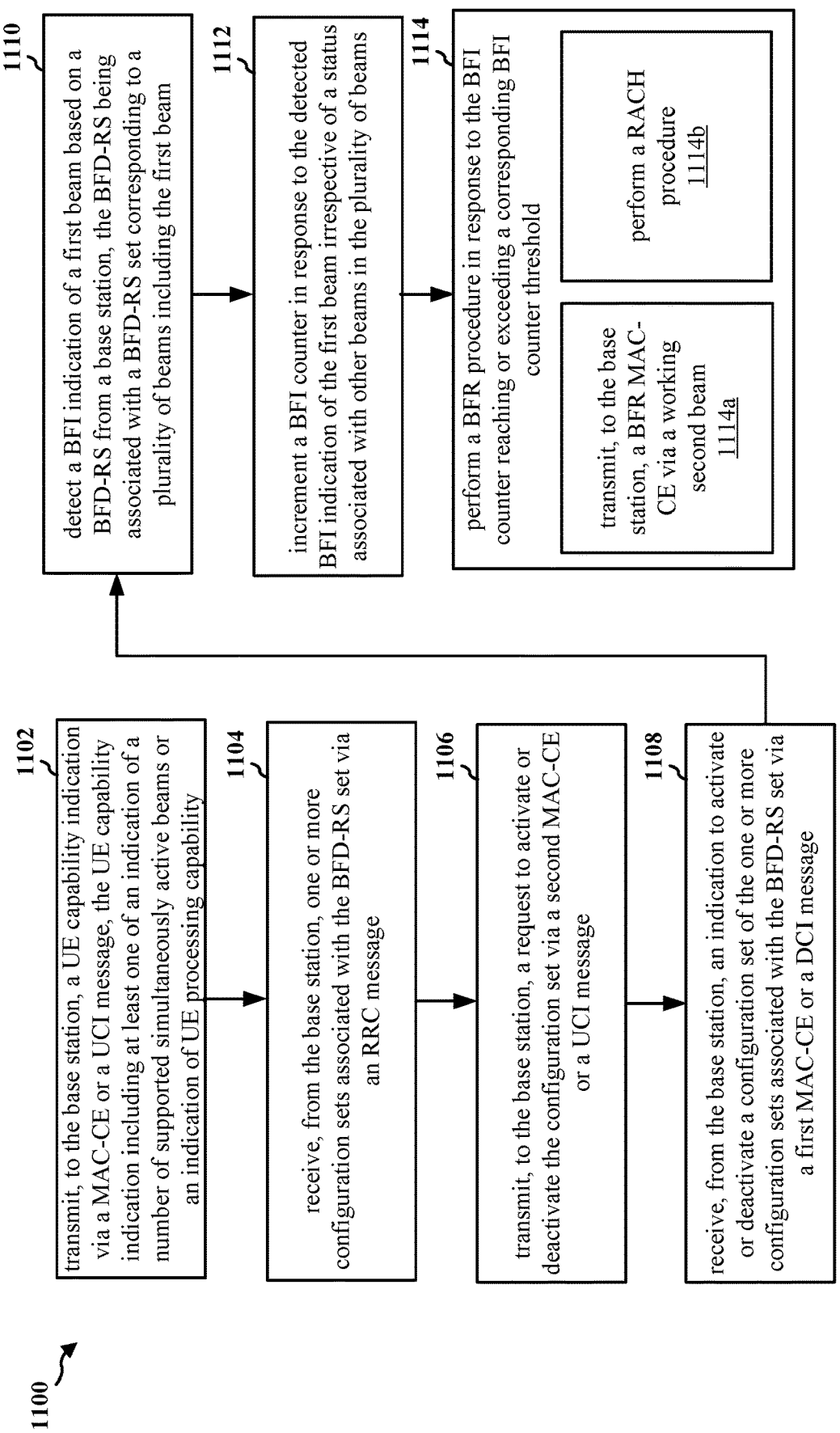
FIG. 11 is a flowchart of a method of wireless communication.

FIG. 11 is a flowchart 1100 of a method of wireless communication. The method may be performed by a UE (e.g., the UE 104/350/902; the apparatus 1402). At 1110, the UE may detect a BFI indication of a first beam based on a BFD-RS from a base station. The BFI indication may correspond to a radio link quality associated with the first beam being below a link quality threshold. The BFD-RS may be associated with a BFD-RS set corresponding to a plurality of beams including the first beam. For example, 1110 may be performed by the beam failure handling component 1440 in FIG. 14. Referring to FIG. 9, at 916, the UE 902 may detect a BFI indication of a first beam based on a BFD-RS from a base station 904.

At 1112, the UE may increment a BFI counter in response to the detected BFI indication of the first beam irrespective of a status associated with other beams in the plurality of beams. For example, 1112 may be performed by the beam failure handling component 1440 in FIG. 14. Referring to FIG. 9, at 918, the UE 902 may increment a BFI counter in response to the detected BFI indication of the first beam irrespective of a status associated with other beams in the plurality of beams.

At 1114, the UE may perform a BFR procedure in response to the BFI counter reaching or exceeding a corresponding BFI counter threshold. For example, 1114 may be performed by the beam failure handling component 1440 in FIG. 14. Referring to FIG. 9, at 920, the UE 902 may perform a BFR procedure in response to the BFI counter reaching or exceeding a corresponding BFI counter threshold.

In one configuration, based on a configuration set associated with the BFD-RS set, the BFI counter and the corresponding BFI counter threshold may be associated with the first beam. Referring to FIG. 9, the BFR procedure 920 may be performed for the first beam.

In one configuration, referring to FIG. 9, at 908, the configuration set may be received from the base station 904.

In one configuration, based on a configuration set associated with the BFD-RS set, the BFI counter and the corresponding BFI counter threshold may be associated with the plurality of beams corresponding to the BFD-RS set. Referring to FIG. 9, the BFR procedure 920 may be performed for the plurality of beams.

In one configuration, referring to FIG. 9, at 908, the configuration set may be received from the base station 904.

In one configuration, at 1102, the UE may transmit, to the base station, a UE capability indication via a MAC-CE or a UCI message. The UE capability indication may include at least one of an indication of a number of supported simultaneously active beams or an indication of UE processing capability. For example, 1102 may be performed by the beam failure handling component 1440 in FIG. 14. Referring to FIG. 9, at 906, the UE 902 may transmit, to the base station 904, a UE capability indication via a MAC-CE or a UCI message.

In one configuration, at 1104, the UE may receive, from the base station, one or more configuration sets associated with the BFD-RS set via an RRC message. Each of the one or more configuration sets may include at least one of a BFD timer configuration, a hypothetical PDCCH BLER threshold configuration, or a BFI counter threshold configuration. For example, 1104 may be performed by the beam failure handling component 1440 in FIG. 14. Referring to FIG. 9, at 908, the UE 902 may receive, from the base station 904, one or more configuration sets associated with the BFD-RS set via an RRC message.

In one configuration, at 1108, the UE may receive, from the base station, an indication to activate or deactivate a configuration set of the one or more configuration sets associated with the BFD-RS set via a first MAC-CE or a DCI message. For example, 1108 may be performed by the beam failure handling component 1440 in FIG. 14. Referring to FIG. 9, at 912, the UE 902 may receive, from the base station 904, an indication to activate or deactivate a configuration set of the one or more configuration sets associated with the BFD-RS set via a first MAC-CE or a DCI message.

In one configuration, the indication to activate or deactivate the configuration set may be based on at least one of a QoS specification, a wireless channel condition, a UE CDRX configuration, a UE power restraint, a UE capability restraint, or a UE capability.

In one configuration, at 1106, the UE may transmit, to the base station, a request to activate or deactivate the configuration set via a second MAC-CE or a UCI message. The indication to activate or deactivate the configuration set may be in response to the request to activate or deactivate the configuration set. For example, 1106 may be performed by the beam failure handling component 1440 in FIG. 14. Referring to FIG. 9, at 910, the UE 902 may transmit, to the base station 904, a request to activate or deactivate the configuration set via a second MAC-CE or a UCI message.

In one configuration, at 1114a, to perform 1114 the BFR procedure, the UE may transmit, to the base station, a BFR MAC-CE via a working second beam. For example, 1114a may be performed by the beam failure handling component 1440 in FIG. 14. Referring to FIG. 9, at 920a, to perform 920 the BFR procedure, the UE 902 may transmit, to the base station 904, a BFR MAC-CE via a working second beam.

In one configuration, at 1114b, to perform 1114 the BFR procedure, the UE may perform a RACH procedure. For example, 1114b may be performed by the beam failure handling component 1440 in FIG. 14. Referring to FIG. 9, at 920b, to perform 920 the BFR procedure, the UE 902 may perform a RACH procedure.

In one configuration, the BFD-RS set may correspond to a TRP.

Figure 12:
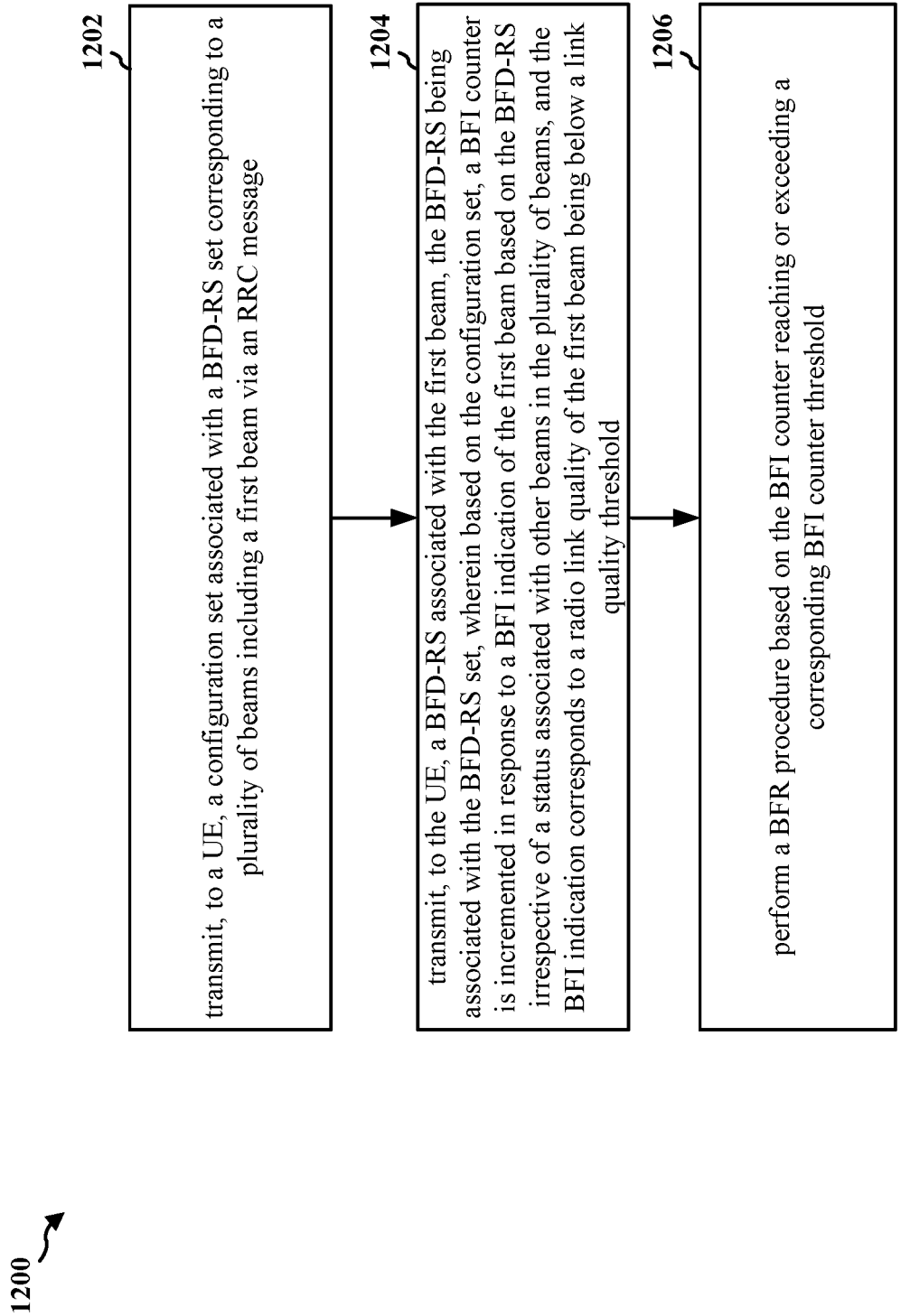
FIG. 12 is a flowchart of a method of wireless communication.

FIG. 12 is a flowchart 1200 of a method of wireless communication. The method may be performed by a base station (e.g., the base station 102/180/310/904; the apparatus 1502). At 1202, the base station may transmit, to a UE, a configuration set associated with a BFD-RS set corresponding to a plurality of beams including a first beam via an RRC message. For example, 1202 may be performed by the beam failure handling component 1540 in FIG. 15. Referring to FIG. 9, at 908, the base station 904 may transmit, to a UE 902, a configuration set associated with a BFD-RS set corresponding to a plurality of beams including a first beam via an RRC message.

At 1204, the base station may transmit, to the UE, a BFD-RS associated with the first beam. The BFD-RS may be associated with the BFD-RS set. Based on the configuration set, incrementation of a BFI counter may be in response to a BFI indication of the first beam based on the BFD-RS irrespective of a status associated with other beams in the plurality of beams. The BFI indication may correspond to a radio link quality of the first beam being below a link quality threshold. For example, 1204 may be performed by the beam failure handling component 1540 in FIG. 15. Referring to FIG. 9, at 914, the base station 904 may transmit, to the UE 902, a BFD-RS associated with the first beam.

At 1206, the base station may perform a BFR procedure based on the BFI counter reaching or exceeding a corresponding BFI counter threshold. For example, 1206 may be performed by the beam failure handling component 1540 in FIG. 15. Referring to FIG. 9, at 920, the base station 904 may perform a BFR procedure based on the BFI counter reaching or exceeding a corresponding BFI counter threshold.

Figure 13:
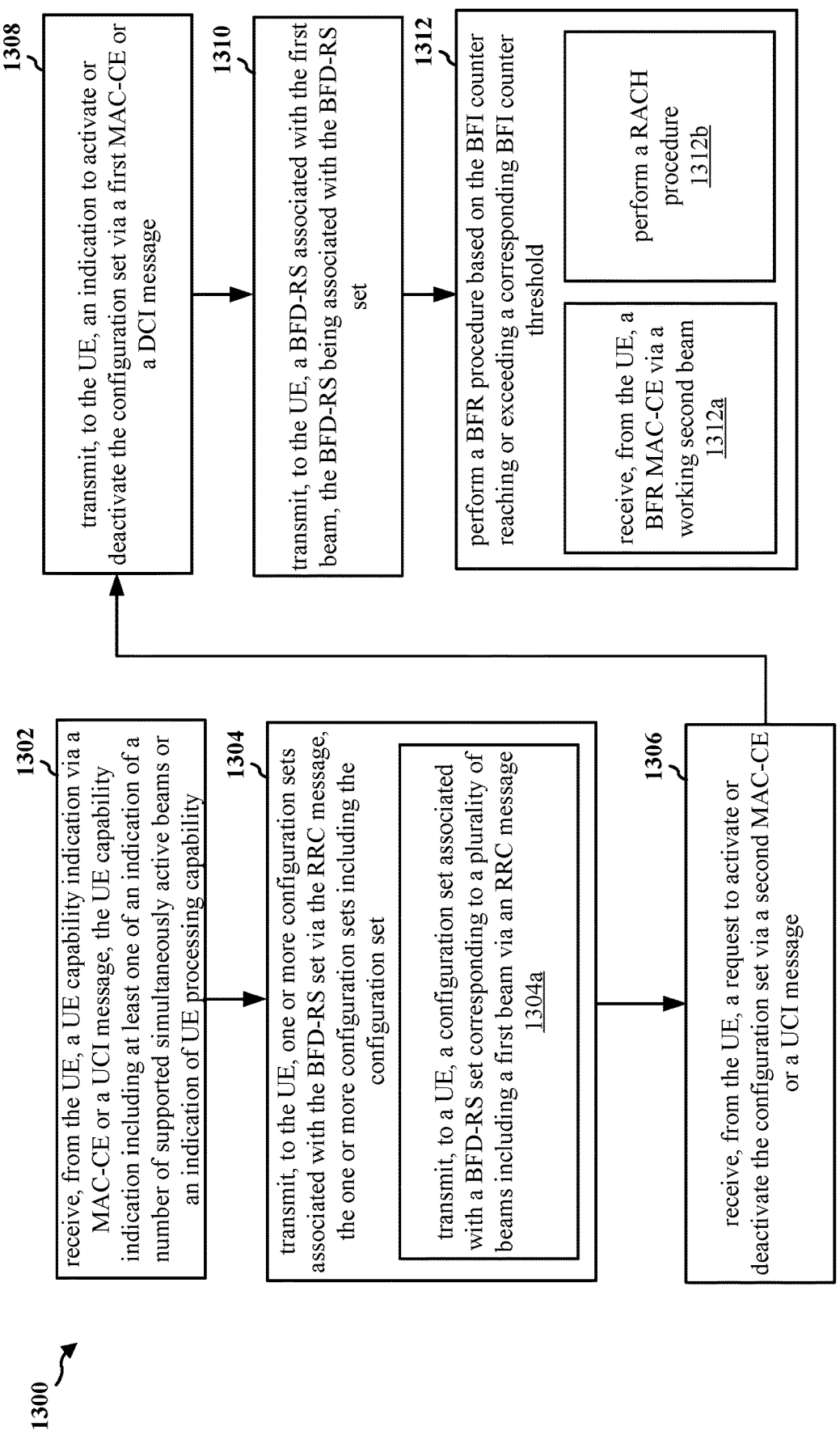
FIG. 13 is a flowchart of a method of wireless communication.

FIG. 13 is a flowchart 1300 of a method of wireless communication. The method may be performed by a base station (e.g., the base station 102/180/310/904; the apparatus 1502). At 1340a, the base station may transmit, to a UE, a configuration set associated with a BFD-RS set corresponding to a plurality of beams including a first beam via an RRC message. For example, 1304a may be performed by the beam failure handling component 1540 in FIG. 15. Referring to FIG. 9, at 908, the base station 904 may transmit, to a UE 902, a configuration set associated with a BFD-RS set corresponding to a plurality of beams including a first beam via an RRC message.

At 1310, the base station may transmit, to the UE, a BFD-RS associated with the first beam. The BFD-RS may be associated with the BFD-RS set. Based on the configuration set, incrementation of a BFI counter may be in response to a BFI indication of the first beam based on the BFD-RS irrespective of a status associated with other beams in the plurality of beams. The BFI indication may correspond to a radio link quality of the first beam being below a link quality threshold. For example, 1310 may be performed by the beam failure handling component 1540 in FIG. 15. Referring to FIG. 9, at 914, the base station 904 may transmit, to the UE 902, a BFD-RS associated with the first beam.

At 1312, the base station may perform a BFR procedure based on the BFI counter reaching or exceeding a corresponding BFI counter threshold. For example, 1312 may be performed by the beam failure handling component 1540 in FIG. 15. Referring to FIG. 9, at 920, the base station 904 may perform a BFR procedure based on the BFI counter reaching or exceeding a corresponding BFI counter threshold.

In one configuration, based on the configuration set associated with the BFD-RS set, the BFI counter and the corresponding BFI counter threshold may be associated with the first beam. Referring to FIG. 9, the BFR procedure may be performed 920 for the first beam.

In one configuration, based on the configuration set associated with the BFD-RS set, the BFI counter and the corresponding BFI counter threshold may be associated with the plurality of beams corresponding to the BFD-RS set. Referring to FIG. 9, the BFR procedure may be performed 920 for the plurality of beams.

In one configuration, at 1302, the base station may receive, from the UE, a UE capability indication via a MAC-CE or a UCI message. The UE capability indication may include at least one of an indication of a number of supported simultaneously active beams or an indication of UE processing capability. For example, 1302 may be performed by the beam failure handling component 1540 in FIG. 15. Referring to FIG. 9, at 906, the base station 904 may receive, from the UE 902, a UE capability indication via a MAC-CE or a UCI message.

In one configuration, at 1304, the base station may transmit, to the UE, one or more configuration sets associated with the BFD-RS set via the RRC message. The one or more configuration sets may include the configuration set. Each of the one or more configuration sets may include at least one of a BFD timer configuration, a hypothetical PDCCH BLER threshold configuration, or a BFI counter threshold configuration. For example, 1304 may be performed by the beam failure handling component 1540 in FIG. 15. Referring to FIG. 9, at 908, the base station may transmit, to the UE 902, one or more configuration sets associated with the BFD-RS set via the RRC message.

In one configuration, at 1308, the base station may transmit, to the UE, an indication to activate or deactivate the configuration set via a first MAC-CE or a DCI message. For example, 1308 may be performed by the beam failure handling component 1540 in FIG. 15. Referring to FIG. 9, at 912, the base station 904 may transmit, to the UE 902, an indication to activate or deactivate the configuration set via a first MAC-CE or a DCI message.

In one configuration, the indication to activate or deactivate the configuration set may be based on at least one of a QoS specification, a wireless channel condition, a UE CDRX configuration, a UE power restraint, a UE capability restraint, or a UE capability.

In one configuration, at 1306, the base station may receive, from the UE, a request to activate or deactivate the configuration set via a second MAC-CE or a UCI message. The indication to activate or deactivate the configuration set may be transmitted in response to the request to activate or deactivate the configuration set. For example, 1306 may be performed by the beam failure handling component 1540 in FIG. 15. Referring to FIG. 9, at 910, the base station 904 may receive, from the UE 902, a request to activate or deactivate the configuration set via a second MAC-CE or a UCI message.

In one configuration, at 1312a, to perform 1312 the BFR procedure, the base station may receive, from the UE, a BFR MAC-CE via a working second beam. For example, 1312a may be performed by the beam failure handling component 1540 in FIG. 15. Referring to FIG. 9, at 920a, to perform 920 the BFR procedure, the base station 904 may receive, from the UE 902, a BFR MAC-CE via a working second beam.

In one configuration, at 1312b, to perform 1312 the BFR procedure, the base station may perform a RACH procedure. For example, 1312b may be performed by the beam failure handling component 1540 in FIG. 15. Referring to FIG. 9, at 920b, to perform 920 the BFR procedure, the base station 904 may perform a RACH procedure.

In one configuration, the BFD-RS set may correspond to a TRP.

Figure 14:
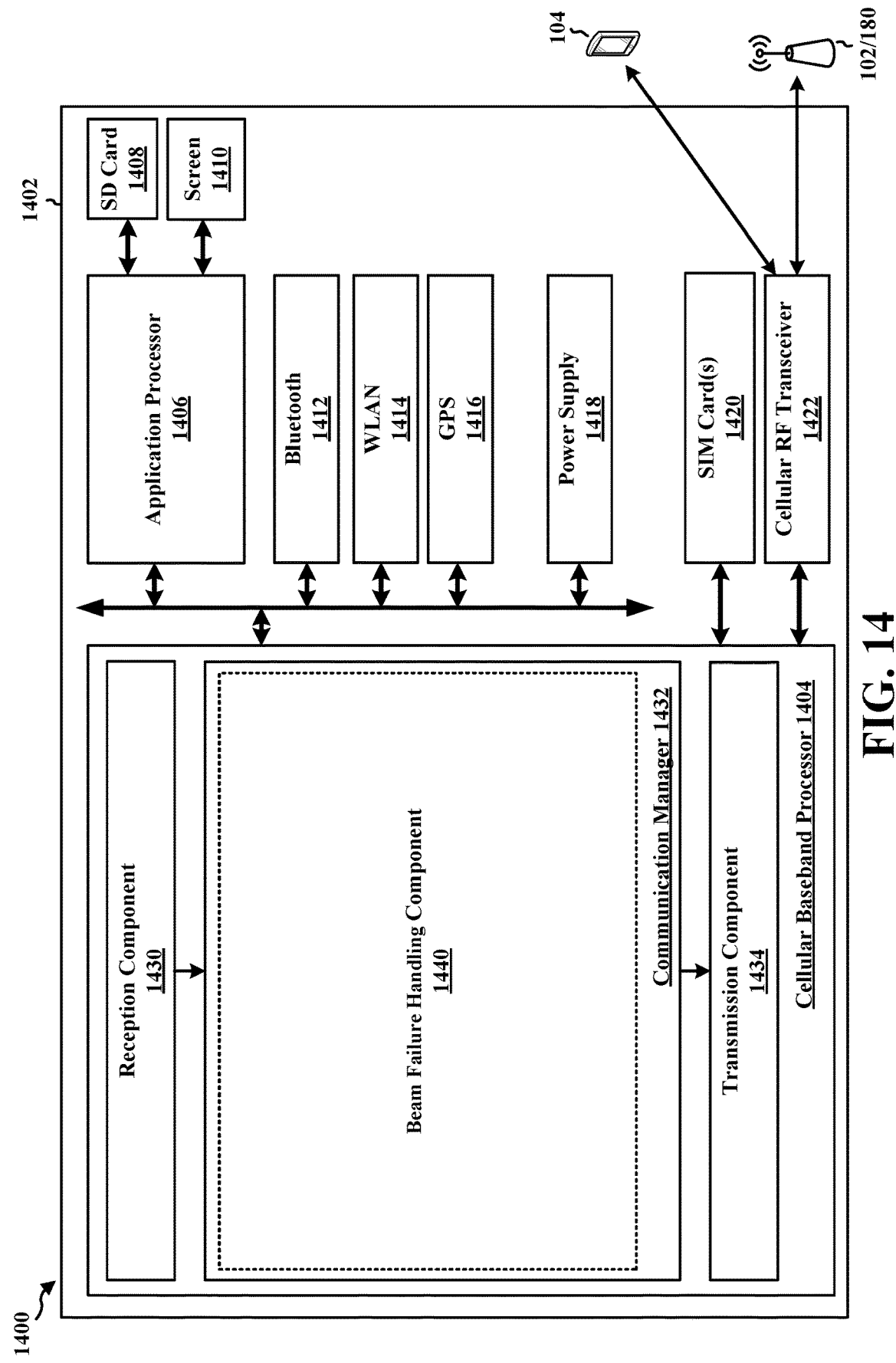
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a beam failure handling component 1440 that is configured to transmit, to the base station, a UE capability indication via a MAC-CE or a UCI message, e.g., as described in connection with 1102 in FIG. 11. The beam failure handling component 1440 may be configured to receive, from the base station, one or more configuration sets associated with the BFD-RS set via an RRC message, e.g., as described in connection with 1104 in FIG. 11. The beam failure handling component 1440 may be configured to transmit, to the base station, a request to activate or deactivate the configuration set via a second MAC-CE or a UCI message, e.g., as described in connection with 1106 in FIG. 11. The beam failure handling component 1440 may be configured to receive, from the base station, an indication to activate or deactivate a configuration set of the one or more configuration sets associated with the BFD-RS set via a first MAC-CE or a DCI message, e.g., as described in connection with 1108 in FIG. 11. The beam failure handling component 1440 may be configured to detect a BFI indication of a first beam based on a BFD-RS from a base station, e.g., as described in connection with 1002 in FIGS. 10 and 1110 in FIG. 11. The beam failure handling component 1440 may be configured to increment a BFI counter in response to the detected BFI indication of the first beam irrespective of a status associated with other beams in the plurality of beams, e.g., as described in connection with 1004 in FIGS. 10 and 1112 in FIG. 11. The beam failure handling component 1440 may be configured to perform a BFR procedure in response to the BFI counter reaching or exceeding a corresponding BFI counter threshold, e.g., as described in connection with 1006 in FIGS. 10 and 1114 in FIG. 11. The beam failure handling component 1440 may be configured to transmit, to the base station, a BFR MAC-CE via a working second beam, e.g., as described in connection with 1114a in FIG. 11. The beam failure handling component 1440 may be configured to perform a RACH procedure, e.g., as described in connection with 1114b in FIG. 11.

The apparatus may include additional components that perform each of the blocks of the algorithm in the flowcharts of FIGS. 9-11. As such, each block in the flowcharts of FIGS. 9-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for detecting a BFI indication of a first beam based on a BFD-RS from a base station. The BFI indication may correspond to a radio link quality associated with the first beam being below a link quality threshold. The BFD-RS may be associated with a BFD-RS set corresponding to a plurality of beams including the first beam. The apparatus 1402, and in particular the cellular baseband processor 1404, includes means for incrementing a BFI counter in response to the detected BFI indication of the first beam irrespective of a status associated with other beams in the plurality of beams. The apparatus 1402, and in particular the cellular baseband processor 1404, includes means for performing a BFR procedure in response to the BFI counter reaching or exceeding a corresponding BFI counter threshold.

In one configuration, based on a configuration set associated with the BFD-RS set, the BFI counter and the corresponding BFI counter threshold may be associated with the first beam. The BFR procedure may be performed for the first beam. In one configuration, the configuration set may be received from the base station. In one configuration, based on a configuration set associated with the BFD-RS set, the BFI counter and the corresponding BFI counter threshold may be associated with the plurality of beams corresponding to the BFD-RS set. The BFR procedure may be performed for the plurality of beams. In one configuration, the configuration set may be received from the base station. In one configuration, the apparatus 1402, and in particular the cellular baseband processor 1404, includes means for transmitting, to the base station, a UE capability indication via a MAC-CE or a UCI message. The UE capability indication may include at least one of an indication of a number of supported simultaneously active beams or an indication of UE processing capability. In one configuration, the apparatus 1402, and in particular the cellular baseband processor 1404, includes means for receiving, from the base station, one or more configuration sets associated with the BFD-RS set via an RRC message. Each of the one or more configuration sets may include at least one of a BFD timer configuration, a hypothetical PDCCH BLER threshold configuration, or a BFI counter threshold configuration. In one configuration, the apparatus 1402, and in particular the cellular baseband processor 1404, includes means for receiving, from the base station, an indication to activate or deactivate a configuration set of the one or more configuration sets associated with the BFD-RS set via a first MAC-CE or a DCI message. In one configuration, the indication to activate or deactivate the configuration set may be based on at least one of a QoS specification, a wireless channel condition, a UE CDRX configuration, a UE power restraint, a UE capability restraint, or a UE capability. In one configuration, the apparatus 1402, and in particular the cellular baseband processor 1404, includes means for transmitting, to the base station, a request to activate or deactivate the configuration set via a second MAC-CE or a UCI message. The indication to activate or deactivate the configuration set may be in response to the request to activate or deactivate the configuration set. In one configuration, the means for performing the BFR procedure may be further configured to transmit, to the base station, a BFR MAC-CE via a working second beam. In one configuration, the means for performing the BFR procedure may be further configured to perform a RACH procedure. In one configuration, the BFD-RS set may correspond to a TRP.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
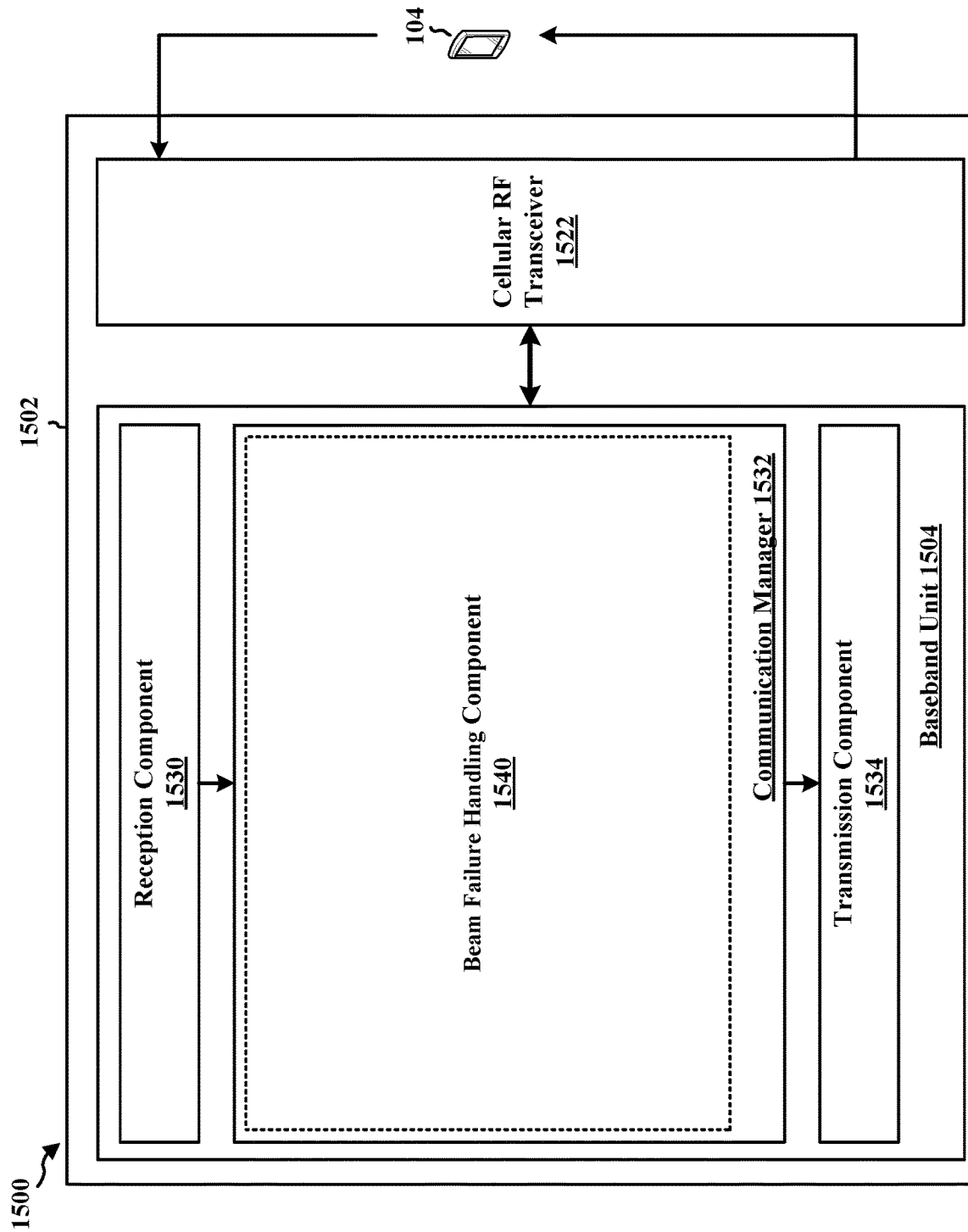
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a beam failure handling component 1540 that may be configured to receive, from the UE, a UE capability indication via a MAC-CE or a UCI message, e.g., as described in connection with 1302 in FIG. 13. The beam failure handling component 1540 may be configured to transmit, to the UE, one or more configuration sets associated with the BFD-RS set via the RRC message, e.g., as described in connection with 1304 in FIG. 13. The beam failure handling component 1540 may be configured to transmit, to a UE, a configuration set associated with a BFD-RS set corresponding to a plurality of beams including a first beam via an RRC message, e.g., as described in connection with 1202 in FIGS. 12 and 1304a in FIG. 13. The beam failure handling component 1540 may be configured to receive, from the UE, a request to activate or deactivate the configuration set via a second MAC-CE or a UCI message, e.g., as described in connection with 1306 in FIG. 13. The beam failure handling component 1540 may be configured to transmit, to the UE, an indication to activate or deactivate the configuration set via a first MAC-CE or a DCI message, e.g., as described in connection with 1308 in FIG. 13. The beam failure handling component 1540 may be configured to transmit, to the UE, a BFD-RS associated with the first beam, the BFD-RS being associated with the BFD-RS set, e.g., as described in connection with 1204 in FIGS. 12 and 1310 in FIG. 13. The beam failure handling component 1540 may be configured to perform a BFR procedure based on the BFI counter reaching or exceeding a corresponding BFI counter threshold, e.g., as described in connection with 1206 in FIGS. 12 and 1312 in FIG. 13. The beam failure handling component 1540 may be configured to receive, from the UE, a BFR MAC-CE via a working second beam, e.g., as described in connection with 1312a in FIG. 13. The beam failure handling component 1540 may be configured to perform a RACH procedure, e.g., as described in connection with 1312b in FIG. 13.

The apparatus may include additional components that perform each of the blocks of the algorithm in the flowcharts of FIGS. 9, 12, and 13. As such, each block in the flowcharts of FIGS. 9, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for transmitting, to a UE, a configuration set associated with a BFD-RS set corresponding to a plurality of beams including a first beam via an RRC message. The apparatus 1502, and in particular the baseband unit 1504, includes means for transmitting, to the UE, a BFD-RS associated with the first beam, the BFD-RS being associated with the BFD-RS set. Based on the configuration set, incrementation of a BFI counter may be in response to a BFI indication of the first beam based on the BFD-RS irrespective of a status associated with other beams in the plurality of beams. The BFI indication may correspond to a radio link quality of the first beam being below a link quality threshold. The apparatus 1502, and in particular the baseband unit 1504, includes means for performing a BFR procedure based on the BFI counter reaching or exceeding a corresponding BFI counter threshold.

In one configuration, based on the configuration set associated with the BFD-RS set, the BFI counter and the corresponding BFI counter threshold may be associated with the first beam. The BFR procedure may be performed for the first beam. In one configuration, based on the configuration set associated with the BFD-RS set, the BFI counter and the corresponding BFI counter threshold may be associated with the plurality of beams corresponding to the BFD-RS set. The BFR procedure may be performed for the plurality of beams. In one configuration, the apparatus 1502, and in particular the baseband unit 1504, includes means for receiving, from the UE, a UE capability indication via a MAC-CE or a UCI message. The UE capability indication may include at least one of an indication of a number of supported simultaneously active beams or an indication of UE processing capability. In one configuration, the apparatus 1502, and in particular the baseband unit 1504, includes means for transmitting, to the UE, one or more configuration sets associated with the BFD-RS set via the RRC message. The one or more configuration sets may include the configuration set. Each of the one or more configuration sets may include at least one of a BFD timer configuration, a hypothetical PDCCH BLER threshold configuration, or a BFI counter threshold configuration. In one configuration, the apparatus 1502, and in particular the baseband unit 1504, includes means for transmitting, to the UE, an indication to activate or deactivate the configuration set via a first MAC-CE or a DCI message. In one configuration, the indication to activate or deactivate the configuration set may be based on at least one of a QoS specification, a wireless channel condition, a UE CDRX configuration, a UE power restraint, a UE capability restraint, or a UE capability. In one configuration, the apparatus 1502, and in particular the baseband unit 1504, includes means for receiving, from the UE, a request to activate or deactivate the configuration set via a second MAC-CE or a UCI message. The indication to activate or deactivate the configuration set may be transmitted in response to the request to activate or deactivate the configuration set. In one configuration, the means for performing the BFR procedure may be further configured to receive, from the UE, a BFR MAC-CE via a working second beam. In one configuration, the means for performing the BFR procedure may be further configured to perform a RACH procedure. In one configuration, the BFD-RS set may correspond to a TRP.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 7-15, a base station may transmit, to a UE, a configuration set associated with a BFD-RS set corresponding to a plurality of beams including a first beam via an RRC message. The base station may transmit, to the UE, a BFD-RS associated with the first beam. The BFD-RS may be associated with the BFD-RS set. The UE may detect a BFI indication of the first beam based on the BFD-RS from the base station. The UE may increment a BFI counter in response to the detected BFI indication of the first beam irrespective of a status associated with other beams in the plurality of beams. The UE and the base station may perform a BFR procedure in response to the BFI counter reaching or exceeding a corresponding BFI counter threshold. In one configuration, based on the configuration set associated with the BFD-RS set, the BFI counter and the corresponding BFI counter threshold may be associated with the first beam, and the BFR procedure may be performed for the first beam. In another configuration, based on the configuration set associated with the BFD-RS set, the BFI counter and the corresponding BFI counter threshold may be associated with the plurality of beams corresponding to the BFD-RS set, and the BFR procedure may be performed for the plurality of beams. Accordingly, a BFD procedure at a finer granularity may be performed, which may be more suitable in certain scenarios (e.g., when the QoS specification is more stringent, or when the wireless channel condition deteriorates).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to detect a BFI indication of a first beam based on a BFD-RS from a base station, the BFI indication corresponding to a radio link quality associated with the first beam being below a link quality threshold, the BFD-RS being associated with a BFD-RS set corresponding to a plurality of beams including the first beam; increment a BFI counter in response to the detected BFI indication of the first beam irrespective of a status associated with other beams in the plurality of beams; and perform a BFR procedure in response to the BFI counter reaching or exceeding a corresponding BFI counter threshold.

Aspect 2 is the apparatus of aspect 1, where based on a configuration set associated with the BFD-RS set, the BFI counter and the corresponding BFI counter threshold are associated with the first beam, and the BFR procedure is performed for the first beam.

Aspect 3 is the apparatus of aspect 2, where the configuration set is received from the base station.

Aspect 4 is the apparatus of aspect 1, where based on a configuration set associated with the BFD-RS set, the BFI counter and the corresponding BFI counter threshold are associated with the plurality of beams corresponding to the BFD-RS set, and the BFR procedure is performed for the plurality of beams.

Aspect 5 is the apparatus of aspect 4, where the configuration set is received from the base station.

Aspect 6 is the apparatus of any of aspects 1 to 5, the at least one processor being further configured to: transmit, to the base station, a UE capability indication via a MAC-CE or a UCI message, the UE capability indication including at least one of an indication of a number of supported simultaneously active beams or an indication of UE processing capability.

Aspect 7 is the apparatus of any of aspects 1 to 6, the at least one processor being further configured to: receive, from the base station, one or more configuration sets associated with the BFD-RS set via an RRC message, each of the one or more configuration sets including at least one of a BFD timer configuration, a hypothetical PDCCH BLER threshold configuration, or a BFI counter threshold configuration.

Aspect 8 is the apparatus of aspect 7, the at least one processor being further configured to: receive, from the base station, an indication to activate or deactivate a configuration set of the one or more configuration sets associated with the BFD-RS set via a first MAC-CE or a DCI message.

Aspect 9 is the apparatus of aspect 8, where the indication to activate or deactivate the configuration set is based on at least one of a QoS specification, a wireless channel condition, a UE CDRX configuration, a UE power restraint, a UE capability restraint, or a UE capability.

Aspect 10 is the apparatus of any of aspects 8 and 9, the at least one processor being further configured to: transmit, to the base station, a request to activate or deactivate the configuration set via a second MAC-CE or a UCI message, where the indication to activate or deactivate the configuration set is in response to the request to activate or deactivate the configuration set.

Aspect 11 is the apparatus of any of aspects 1 to 10, where to perform the BFR procedure, the at least one processor is further configured to: transmit, to the base station, a BFR MAC-CE via a working second beam.

Aspect 12 is the apparatus of any of aspects 1 to 11, where to perform the BFR procedure, the at least one processor is further configured to: perform a RACH procedure.

Aspect 13 is the apparatus of any of aspects 1 to 12, where the BFD-RS set corresponds to a TRP.

Aspect 14 is the apparatus of any of aspects 1 to 13, further including a transceiver coupled to the at least one processor.

Aspect 15 is an apparatus for wireless communication at a base station including at least one processor coupled to a memory and configured to transmit, to a UE, a configuration set associated with a BFD-RS set corresponding to a plurality of beams including a first beam via an RRC message; transmit, to the UE, a BFD-RS associated with the first beam, the BFD-RS being associated with the BFD-RS set, where based on the configuration set, incrementation of a BFI counter is in response to a BFI indication of the first beam based on the BFD-RS irrespective of a status associated with other beams in the plurality of beams; and perform a BFR procedure based on the BFI counter reaching or exceeding a corresponding BFI counter threshold, and the BFI indication corresponds to a radio link quality of the first beam being below a link quality threshold.

Aspect 16 is the apparatus of aspect 15, where based on the configuration set associated with the BFD-RS set, the BFI counter and the corresponding BFI counter threshold are associated with the first beam, and the BFR procedure is performed for the first beam.

Aspect 17 is the apparatus of aspect 15, where based on the configuration set associated with the BFD-RS set, the BFI counter and the corresponding BFI counter threshold are associated with the plurality of beams corresponding to the BFD-RS set, and the BFR procedure is performed for the plurality of beams.

Aspect 18 is the apparatus of aspect 15, the at least one processor being further configured to: receive, from the UE, a UE capability indication via a MAC-CE or a UCI message, the UE capability indication including at least one of an indication of a number of supported simultaneously active beams or an indication of UE processing capability.

Aspect 19 is the apparatus of any of aspects 15 to 18, the at least one processor being further configured to: transmit, to the UE, one or more configuration sets associated with the BFD-RS set via the RRC message, the one or more configuration sets including the configuration set, each of the one or more configuration sets including at least one of a BFD timer configuration, a hypothetical PDCCH BLER threshold configuration, or a BFI counter threshold configuration.

Aspect 20 is the apparatus of aspect 19, the at least one processor being further configured to: transmit, to the UE, an indication to activate or deactivate the configuration set via a first MAC-CE or a DCI message.

Aspect 21 is the apparatus of aspect 20, where the indication to activate or deactivate the configuration set is based on at least one of a QoS specification, a wireless channel condition, a UE CDRX configuration, a UE power restraint, a UE capability restraint, or a UE capability.

Aspect 22 is the apparatus of any of aspects 20 and 21, the at least one processor being further configured to: receive, from the UE, a request to activate or deactivate the configuration set via a second MAC-CE or a UCI message, where the indication to activate or deactivate the configuration set is transmitted in response to the request to activate or deactivate the configuration set.

Aspect 23 is the apparatus of any of aspects 15 to 22, where to perform the BFR procedure, the at least one processor is further configured to: receive, from the UE, a BFR MAC-CE via a working second beam.

Aspect 24 is the apparatus of any of aspects 15 to 23, where to perform the BFR procedure, the at least one processor is further configured to: perform a RACH procedure.

Aspect 25 is the apparatus of any of aspects 15 to 24, where the BFD-RS set corresponds to a TRP.

Aspect 26 is the apparatus of any of aspects 15 to 25, further including a transceiver coupled to the at least one processor.

Aspect 27 is a method of wireless communication for implementing any of aspects 1 to 26.

Aspect 28 is an apparatus for wireless communication including means for implementing any of aspects 1 to 26.

Aspect 29 is a computer-readable medium storing computer executable code, where the code when executed by a processor causes the processor to implement any of aspects 1 to 26.

What is claimed is:

1. An apparatus for wireless communication at a user equipment (UE), comprising:
   a memory; and
   at least one processor coupled to the memory and configured to:
     detect a beam failure instance (BFI) indication of a first beam based on a beam failure detection (BFD)—reference signal (RS) (BFD-RS) from a base station, the BFI indication corresponding to a radio link quality of the first beam being below a link quality threshold, the BFD-RS being associated with a BFD-RS set corresponding to a plurality of beams including the first beam;

increment a BFI counter in response to the detected BFI indication of the first beam irrespective of a status associated with other beams in the plurality of beams; and perform a beam failure recovery (BFR) procedure in response to the BFI counter reaching or exceeding a corresponding BFI counter threshold, wherein based on a configuration set associated with the BFD-RS set, the BFI counter and the corresponding BFI counter threshold are associated with the plurality of beams corresponding to the BFD-RS set, and the BFR procedure is performed for the plurality of beams.

2. The apparatus of claim 1, wherein the configuration set is received from the base station.

3. The apparatus of claim 1, the at least one processor being further configured to:

transmit, to the base station, a UE capability indication via a medium access control (MAC)-control element (CE) (MAC-CE) or an uplink control information (UCI) message, the UE capability indication including at least one of an indication of a number of supported simultaneously active beams or an indication of UE processing capability.

4. The apparatus of claim 1, the at least one processor being further configured to:

receive, from the base station, one or more configuration sets associated with the BFD-RS set via a radio resource control (RRC) message, each of the one or more configuration sets including at least one of a BFD timer configuration, a hypothetical physical downlink control channel (PDCCH) block error ratio (BLER) threshold configuration, or a BFI counter threshold configuration.

5. The apparatus of claim 4, the at least one processor being further configured to:

receive, from the base station, an indication to activate or deactivate a configuration set of the one or more configuration sets associated with the BFD-RS set via a first medium access control (MAC)—control element (CE) (MAC-CE) or a downlink control information (DCI) message.

6. The apparatus of claim 5, wherein the indication to activate or deactivate the configuration set is based on at least one of a quality of service (QoS) specification, a wireless channel condition, a UE connected mode discontinuous reception (CDRX) configuration, a UE power restraint, a UE capability restraint, or a UE capability.

7. The apparatus of claim 5, the at least one processor being further configured to:

transmit, to the base station, a request to activate or deactivate the configuration set via a second MAC-CE or an uplink control information (UCI) message, wherein the indication to activate or deactivate the configuration set is in response to the request to activate or deactivate the configuration set.

8. The apparatus of claim 1, wherein to perform the BFR procedure, the at least one processor is further configured to:

transmit, to the base station, a BFR medium access control (MAC)-control element (CE) (MAC-CE) via a working second beam.

9. The apparatus of claim 1, wherein to perform the BFR procedure, the at least one processor is further configured to:

perform a random access channel (RACH) procedure.

10. The apparatus of claim 1, wherein the BFD-RS set corresponds to a transmission reception point (TRP).

11. The apparatus of claim 1, further comprising a transceiver coupled to the at least one processor.

12. A method of wireless communication at a user equipment (UE), comprising:

detecting a beam failure instance (BFI) indication of a first beam based on a beam failure detection (BFD)-reference signal (RS) (BFD-RS) from a base station, the BFI indication corresponding to a radio link quality associated with the first beam being below a link quality threshold, the BFD-RS being associated with a BFD-RS set corresponding to a plurality of beams including the first beam;

incrementing a BFI counter in response to the detected BFI indication of the first beam irrespective of a status associated with other beams in the plurality of beams; and performing a beam failure recovery (BFR) procedure in response to the BFI counter reaching or exceeding a corresponding BFI counter threshold, wherein based on a configuration set associated with the BFD-RS set, the BFI counter and the corresponding BFI counter threshold are associated with the plurality of beams corresponding to the BFD-RS set, and the BFR procedure is performed for the plurality of beams.

13. An apparatus for wireless communication at a base station, comprising:

a memory; and at least one processor coupled to the memory and configured to:

transmit, to a user equipment (UE), a configuration set associated with a beam failure detection (BFD)-reference signal (RS) (BFD-RS) set corresponding to a plurality of beams including a first beam via a radio resource control (RRC) message;

transmit, to the UE, a BFD-RS associated with the first beam, the BFD-RS being associated with the BFD-RS set, wherein based on the configuration set, incrementation of a beam failure instance (BFI) counter is in response to a BFI indication of the first beam based on the BFD-RS irrespective of a status associated with other beams in the plurality of beams, and the BFI indication corresponds to a radio link quality of the first beam being below a link quality threshold; and perform a beam failure recovery (BFR) procedure based on the BFI counter reaching or exceeding a corresponding BFI counter threshold, wherein based on a configuration set associated with the BFD-RS set, the BFI counter and the corresponding BFI counter threshold are associated with the plurality of beams corresponding to the BFD-RS set, and the BFR procedure is performed for the plurality of beams.

14. The apparatus of claim 13, the at least one processor being further configured to:

receive, from the UE, a UE capability indication via a medium access control (MAC)-control element (CE) (MAC-CE) or an uplink control information (UCI) message, the UE capability indication including at least one of an indication of a number of supported simultaneously active beams or an indication of UE processing capability.

15. The apparatus of claim 13, the at least one processor being further configured to:

transmit, to the UE, one or more configuration sets associated with the BFD-RS set via the radio resource control (RRC) message, the one or more configuration sets including the configuration set, each of the one or more configuration sets including at least one of a BFD timer configuration, a hypothetical physical downlink control channel (PDCCH) block error ratio (BLER) threshold configuration, or a BFI counter threshold configuration.

16. The apparatus of claim 15, the at least one processor being further configured to:
transmit, to the UE, an indication to activate or deactivate the configuration set via a first medium access control (MAC)-control element (CE) (MAC-CE) or a downlink control information (DCI) message.

17. The apparatus of claim 16, wherein the indication to activate or deactivate the configuration set is based on at least one of a quality of service (QoS) specification, a wireless channel condition, a UE connected mode discontinuous reception (CDRX) configuration, a UE power restraint, a UE capability restraint, or a UE capability.

18. The apparatus of claim 16, the at least one processor being further configured to:
receive, from the UE, a request to activate or deactivate the configuration set via a second MAC-CE or an uplink control information (UCI) message, wherein the indication to activate or deactivate the configuration set is transmitted in response to the request to activate or deactivate the configuration set.

19. The apparatus of claim 13, wherein to perform the BFR procedure, the at least one processor is further configured to:
receive, from the UE, a BFR medium access control (MAC)-control element (CE) (MAC-CE) via a working second beam.

20. The apparatus of claim 13, wherein to perform the BFR procedure, the at least one processor is further configured to:
perform a random access channel (RACH) procedure.

21. The apparatus of claim 13, wherein the BFD-RS set corresponds to a transmission reception point (TRP).

22. The apparatus of claim 13, further comprising a transceiver coupled to the at least one processor.

23. A method of wireless communication at a base station, comprising:
transmitting, to a user equipment (UE), a configuration set associated with a beam failure detection (BFD)-reference signal (RS) (BFD-RS) set corresponding to a plurality of beams including a first beam via a radio resource control (RRC) message;
transmitting, to the UE, a BFD-RS associated with the first beam, the BFD-RS being associated with the BFD-RS set, wherein based on the configuration set, incrementation of a beam failure instance (BFI) counter is in response to a BFI indication of the first beam based on the BFD-RS irrespective of a status associated with other beams in the plurality of beams, and the BFI indication corresponds to a radio link quality of the first beam being below a link quality threshold; and
performing a beam failure recovery (BFR) procedure based on the BFI counter reaching or exceeding a corresponding BFI counter threshold, wherein based on a configuration set associated with the BFD-RS set, the BFI counter and the corresponding BFI counter threshold are associated with the plurality of beams corresponding to the BFD-RS set, and the BFR procedure is performed for the plurality of beams.

* * * * *